United States Patent [19]
Tsutsumi

[11] Patent Number: 5,991,092
[45] Date of Patent: Nov. 23, 1999

[54] ZOOM LENS

[75] Inventor: Katsuhisa Tsutsumi, Omiya, Japan

[73] Assignee: Fuji Photo Optical Co., Ltd., Saitama, Japan

[21] Appl. No.: 08/967,946

[22] Filed: Nov. 12, 1997

[30] Foreign Application Priority Data

Dec. 11, 1996 [JP] Japan ................................ 8-352055

[51] Int. Cl.⁶ .......................................... G02B 15/14
[52] U.S. Cl. ........................ 359/684; 359/683; 359/687
[58] Field of Search .................................. 359/676, 683, 359/684, 687

[56] References Cited

U.S. PATENT DOCUMENTS

| | | | |
|---|---|---|---|
| 5,583,700 | 12/1996 | Usui et al. | 359/688 |
| 5,745,300 | 4/1998 | Usui et al. | 359/684 |
| 5,760,967 | 6/1998 | Terasawa et al. | 359/684 |
| 5,808,809 | 9/1998 | Yahangi | 359/683 |

FOREIGN PATENT DOCUMENTS 6-59191   3/1994   Japan.

*Primary Examiner*—Georgia Epps
*Assistant Examiner*—David N. Spector
*Attorney, Agent, or Firm*—Ronald R. Snider

[57] ABSTRACT

In a master lens section having an imaging effect, a luminous divergent lens portion having a negative refracting power is disposed on the object side of an aperture stop, whereby Petzval sum is restrained from greatly becoming negative, thus keeping image quality in the periphery of the image surface from deteriorating. In a master lens group M, a concave lens $L_{18}$ a having a negative refracting power is disposed on the object side of an aperture stop 2, thus decreasing the distance between a zoom lens second group Z2 and the concave lens $L_{18}$ at the wide-angle end, so that the incident luminous flux moderately diverges at an early stage, thus restraining Petzval sum from becoming greatly negative.

4 Claims, 21 Drawing Sheets

EXAMPLE 1

EXAMPLE 1

EXAMPLE 2

EXAMPLE 2

COMPARATIVE EXAMPLE 1

FIG.8 COMPARATIVE EXAMPLE 2

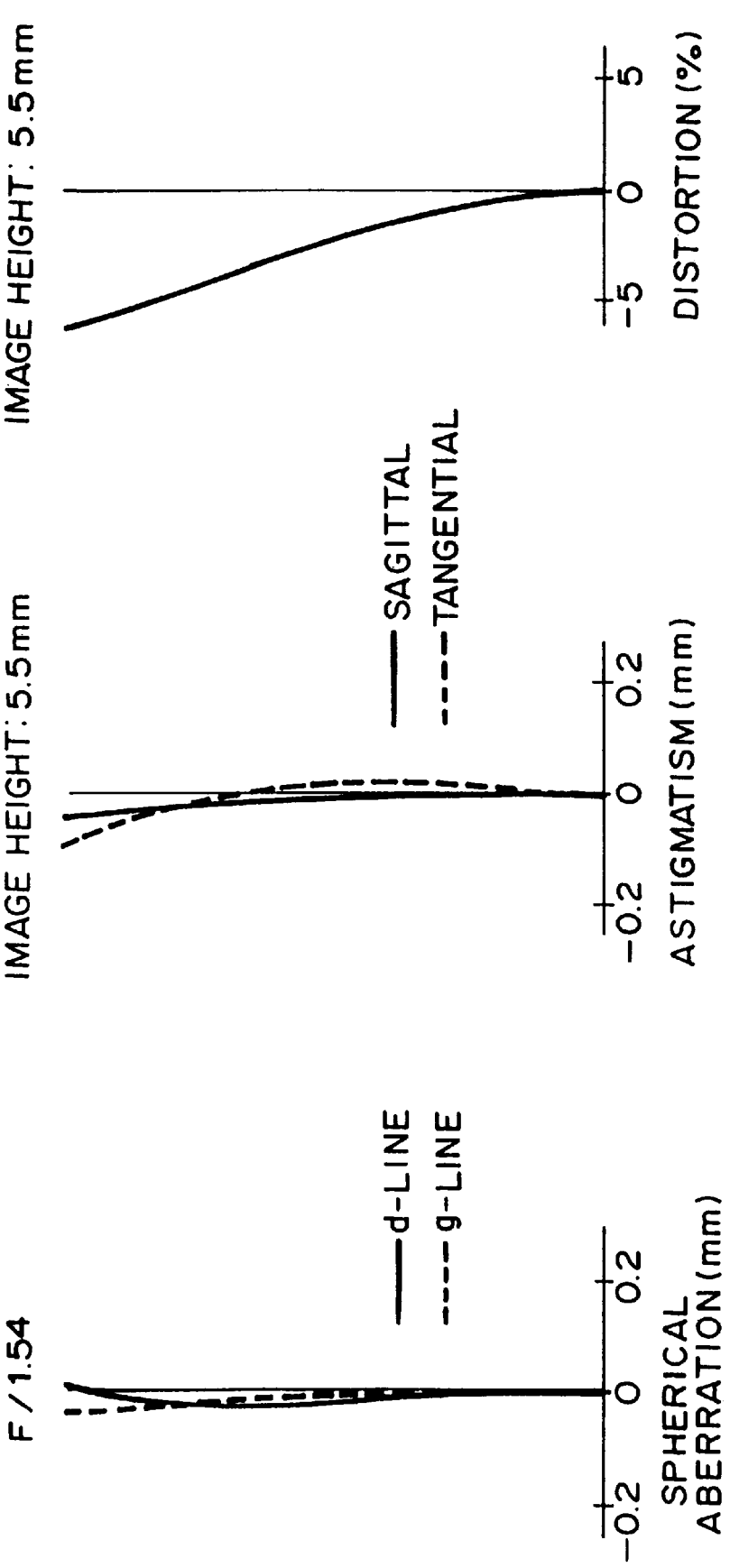

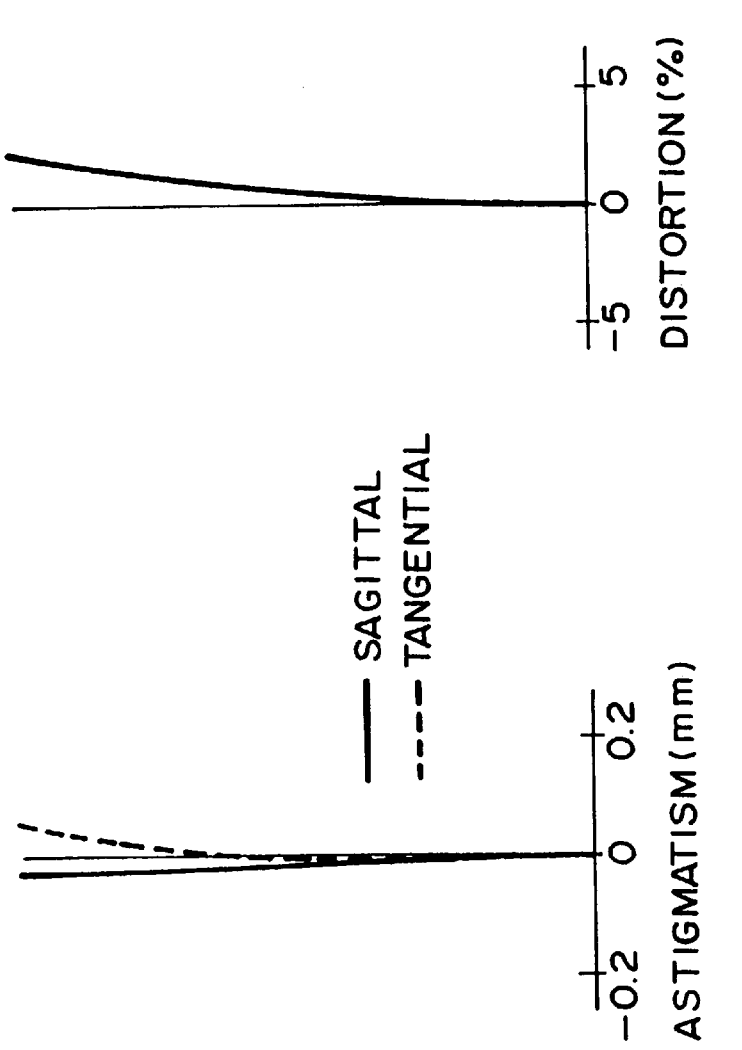

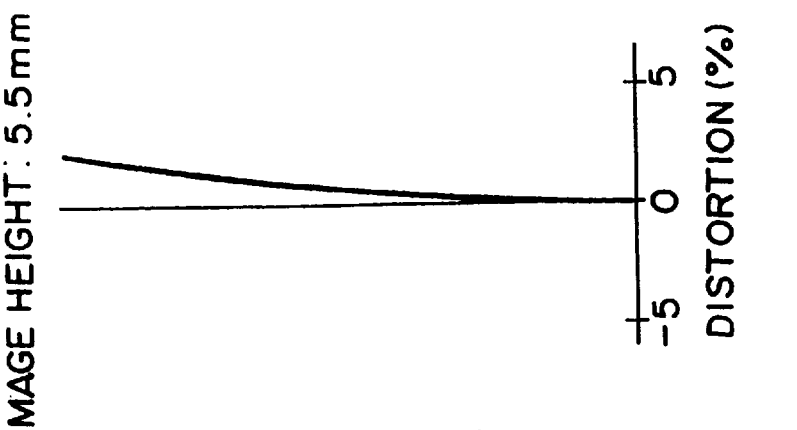
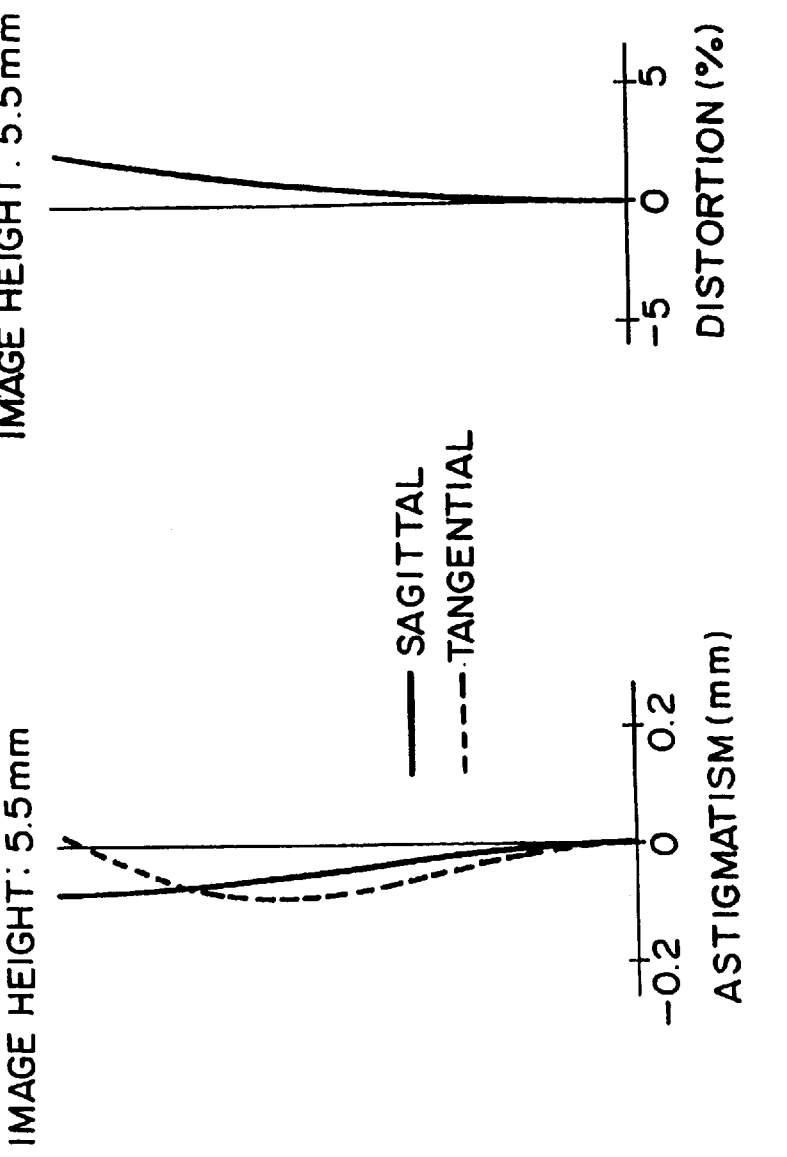
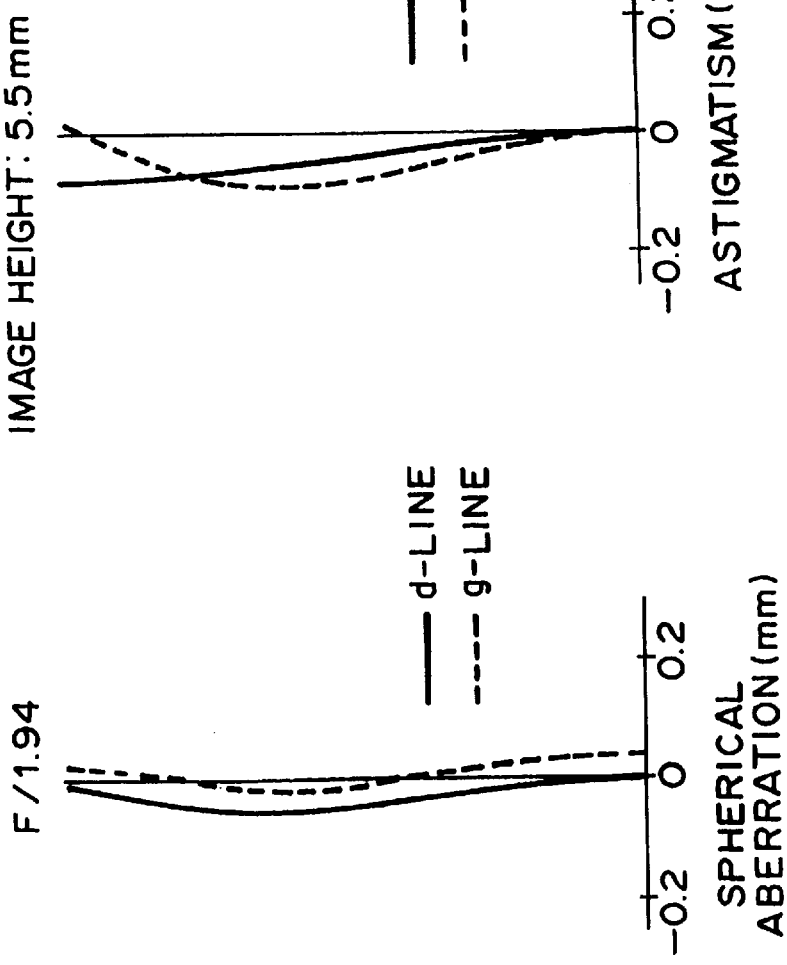

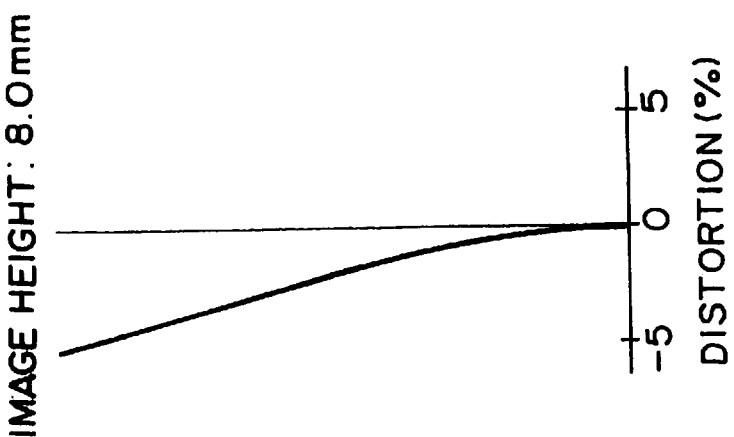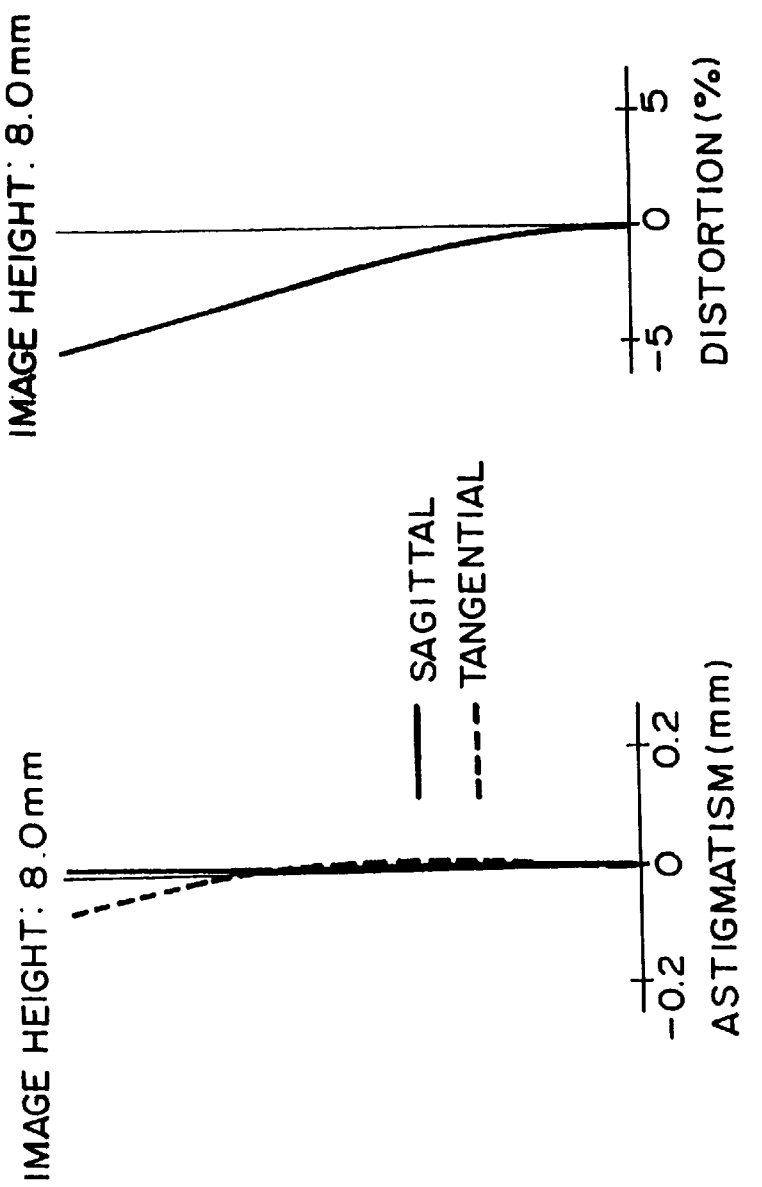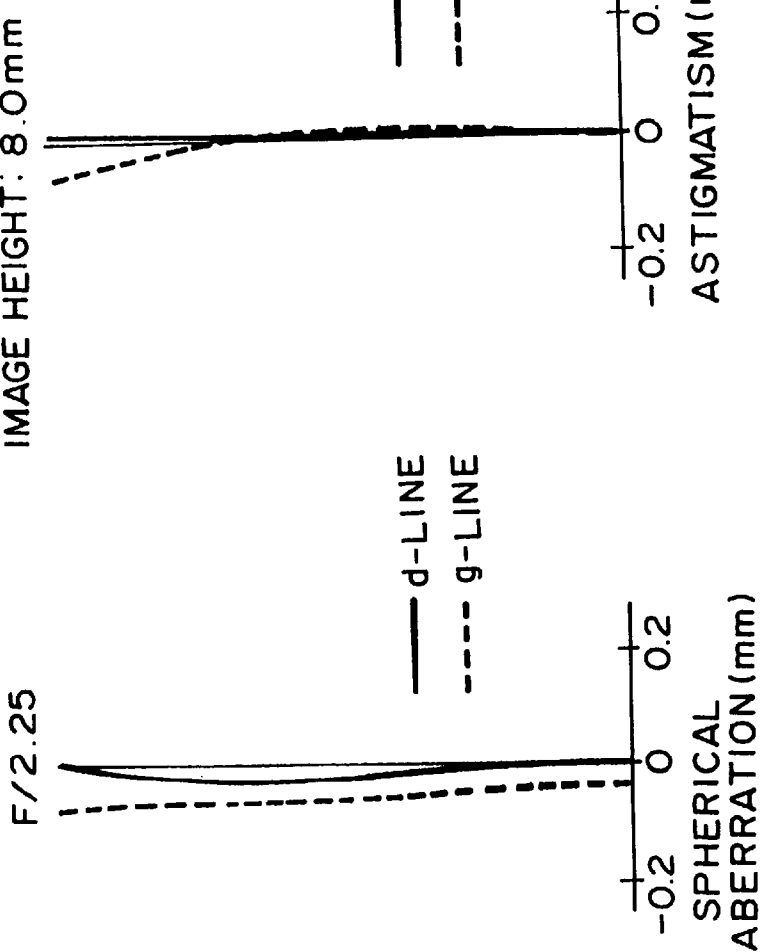

EXMPLE 2
(f=122.8)

EXMPLE 2
(f=122.8)

EXMPLE 2
(f=122.8)

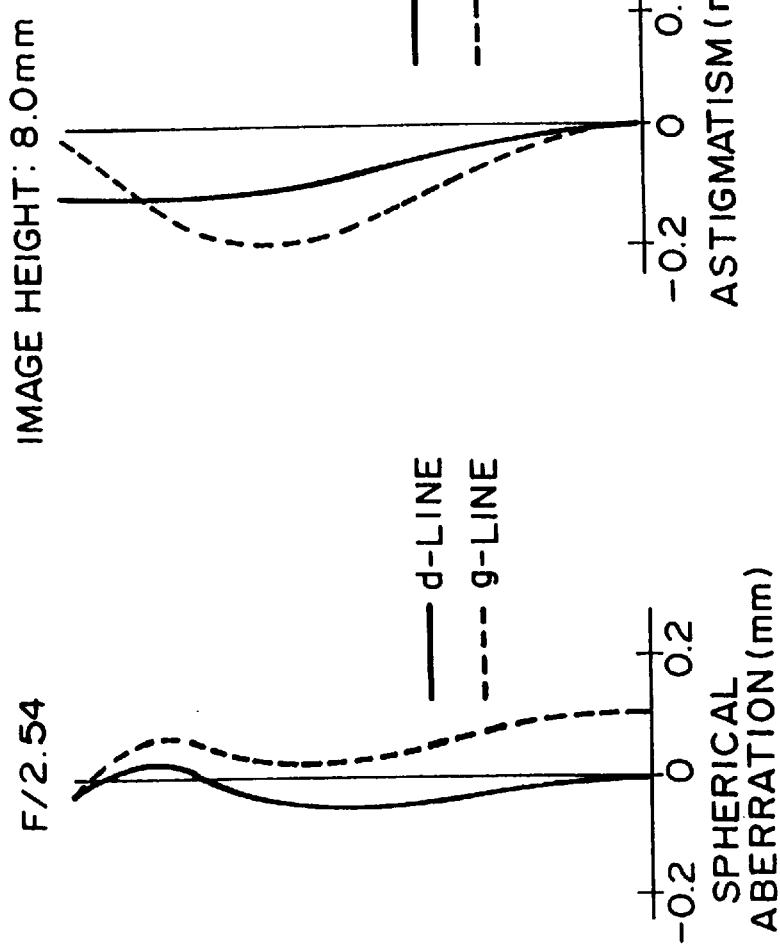
FIG.15A EXAMPLE 2 (f=212.38)
FIG.15B EXAMPLE 2 (f=212.38)
FIG.15C EXAMPLE 2 (f=212.38)

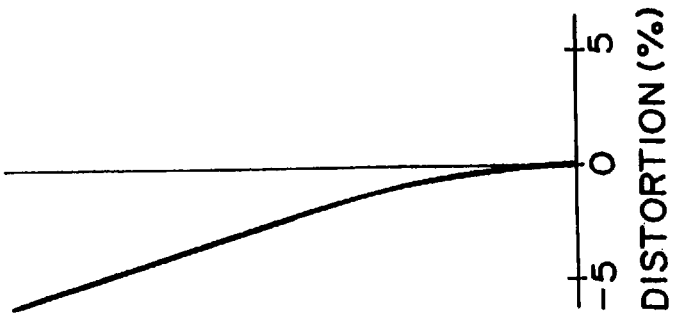
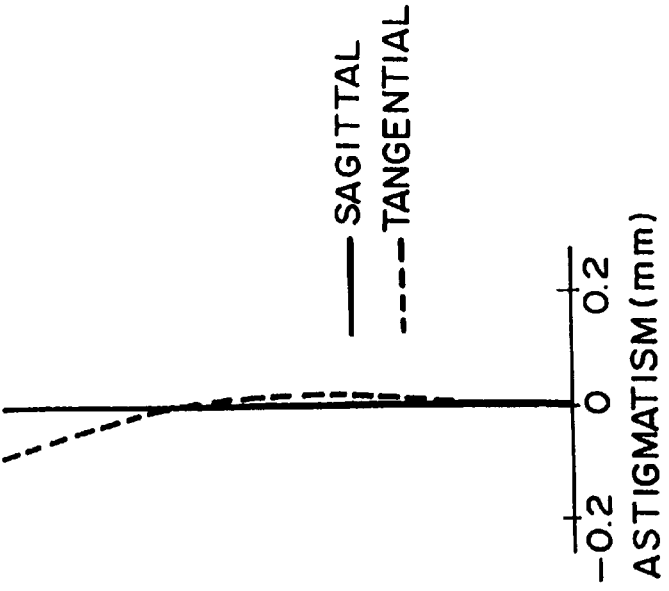
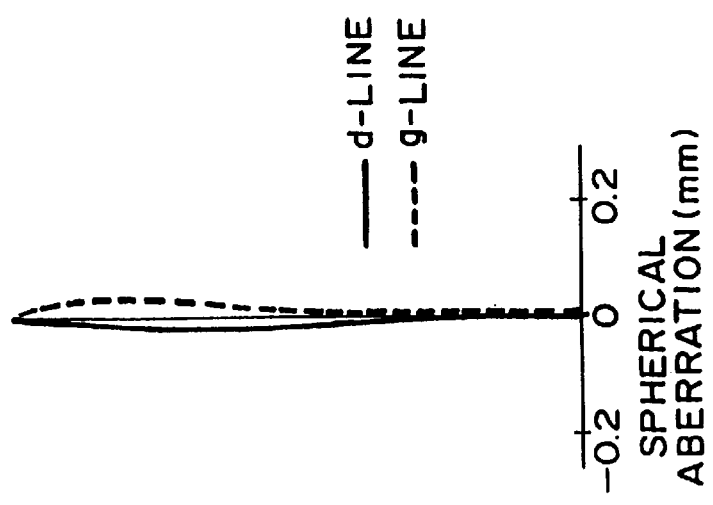

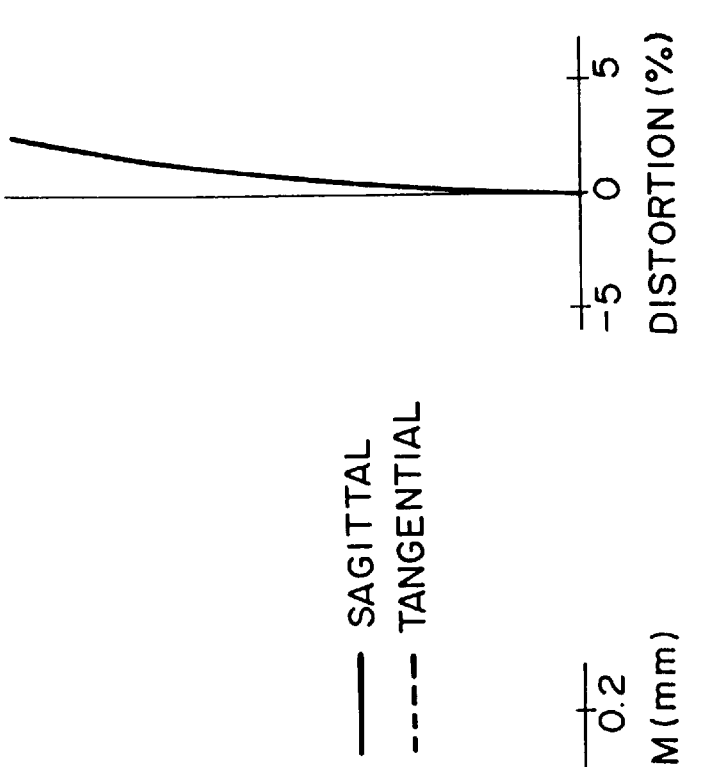
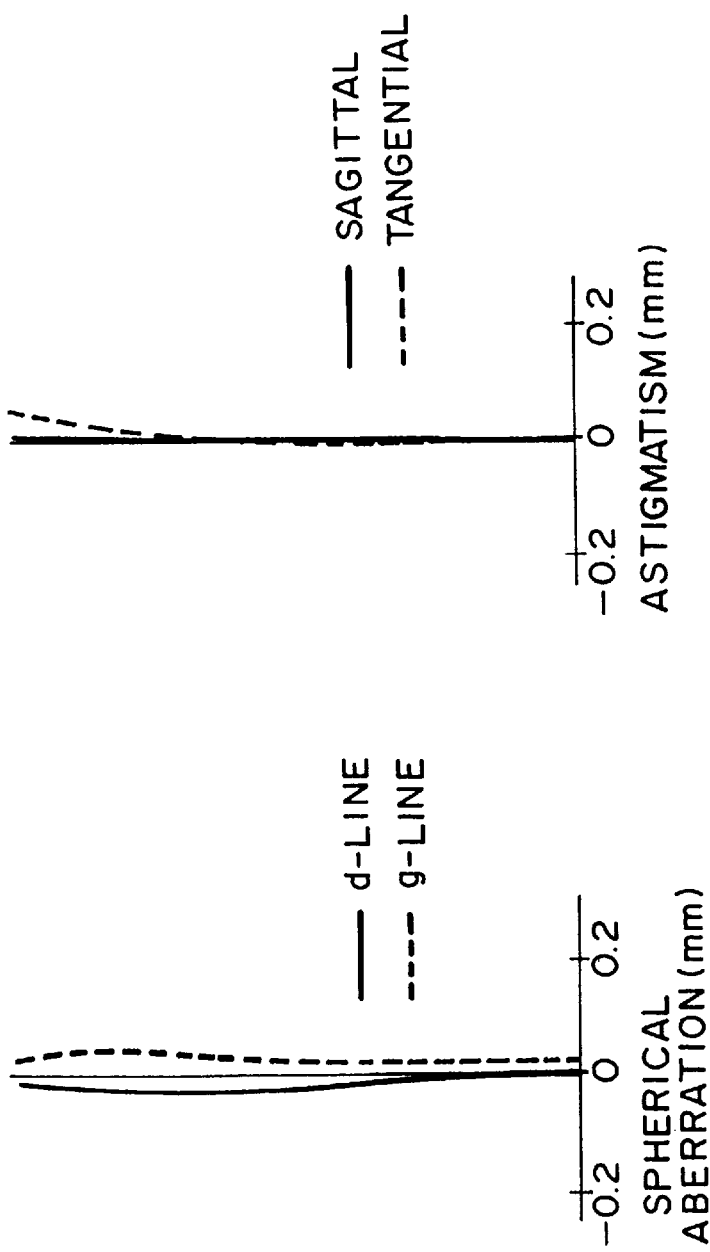

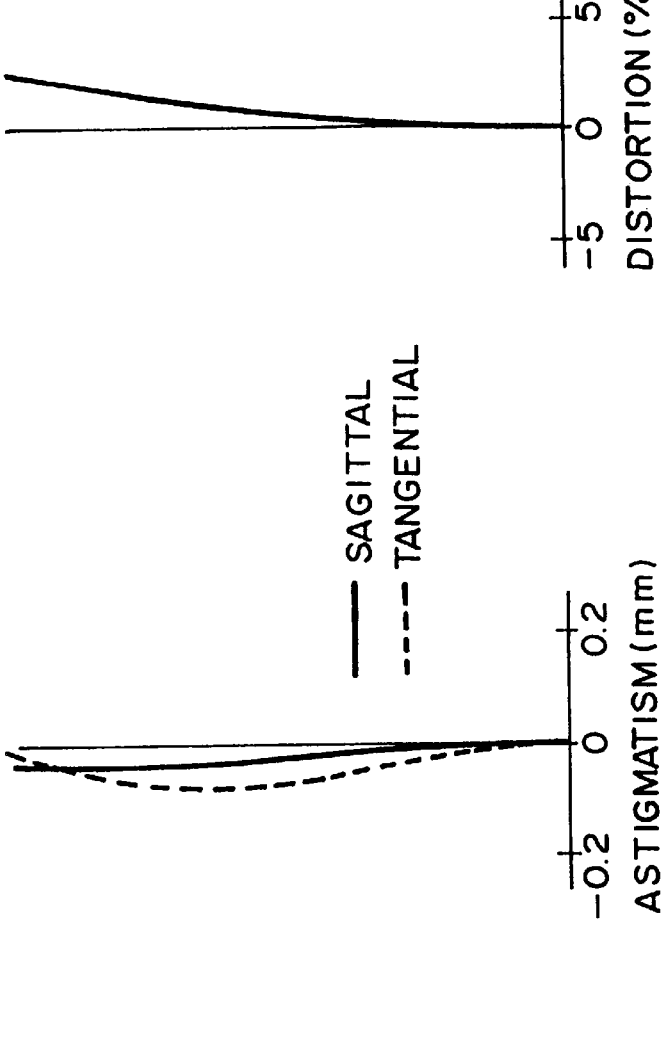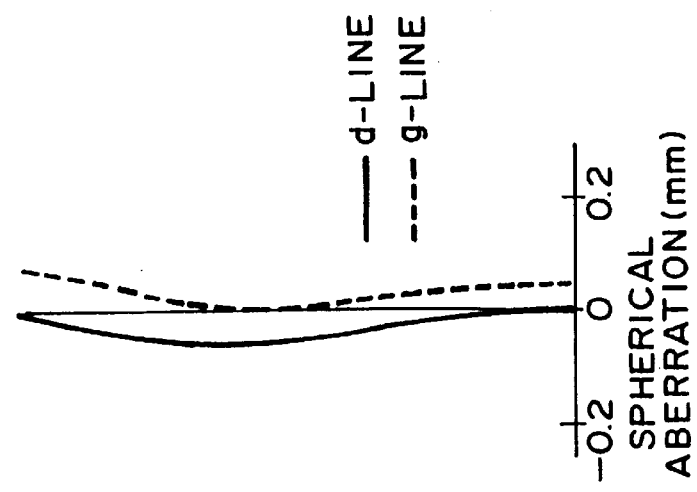

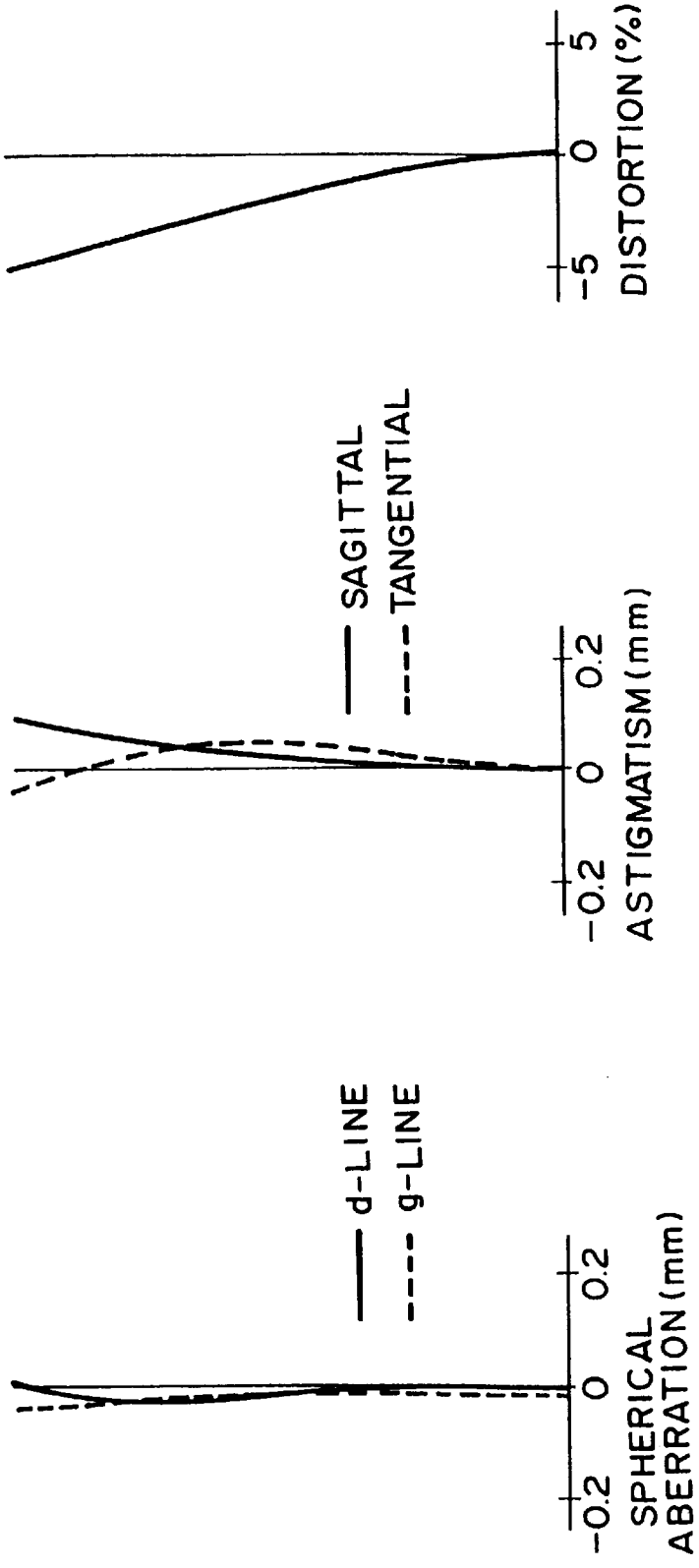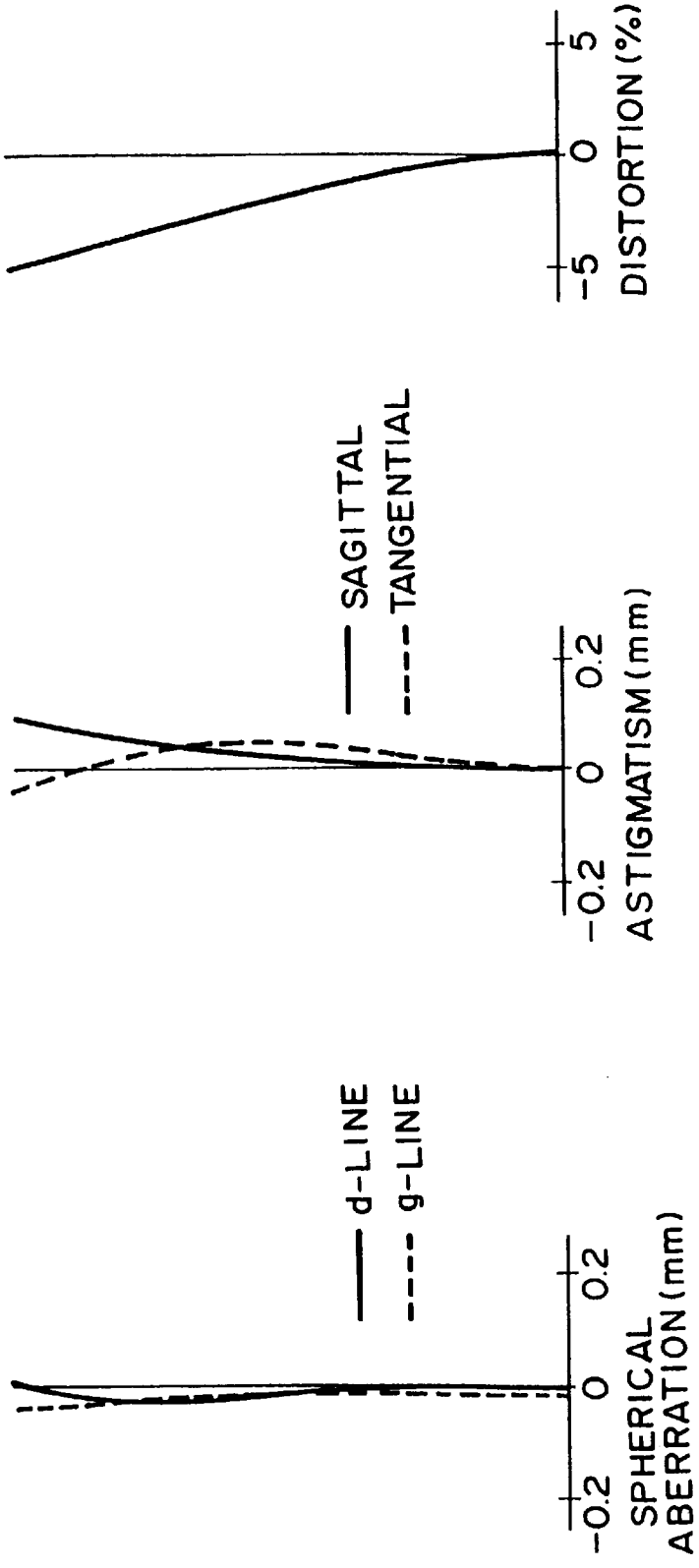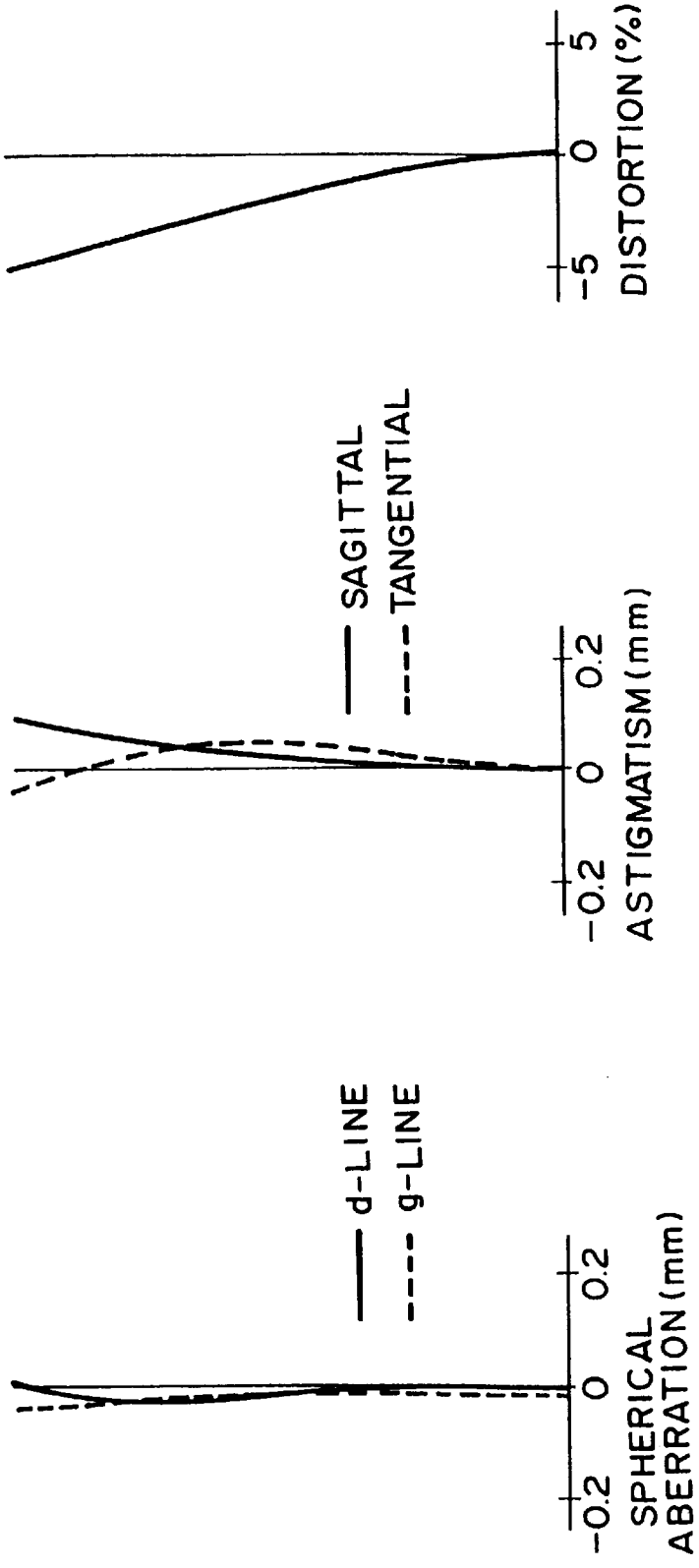

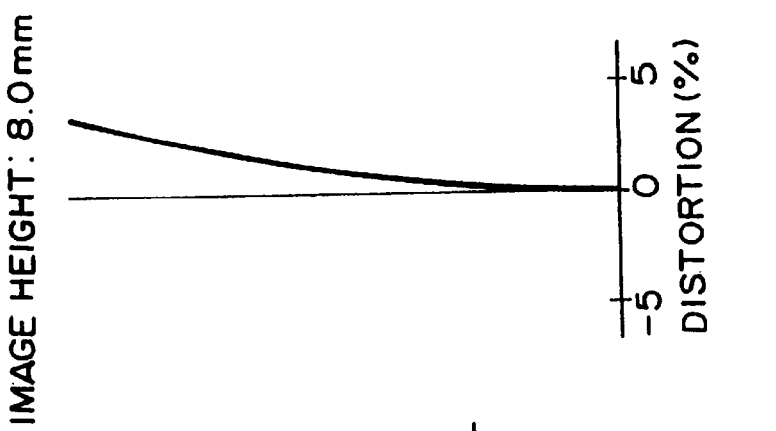
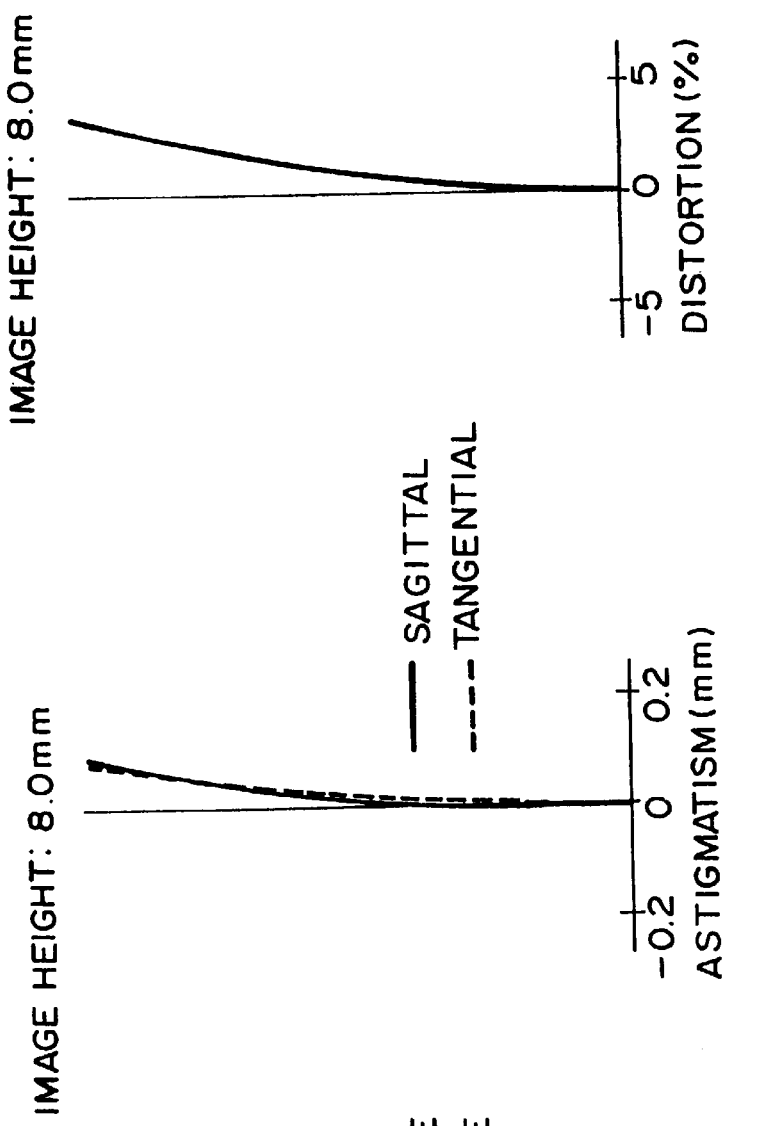
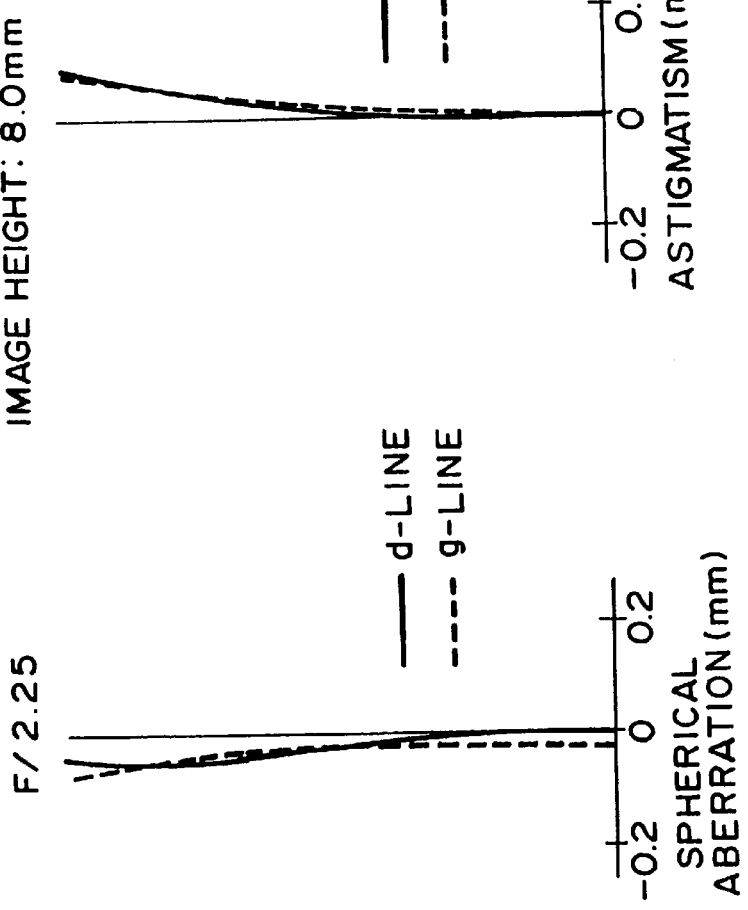

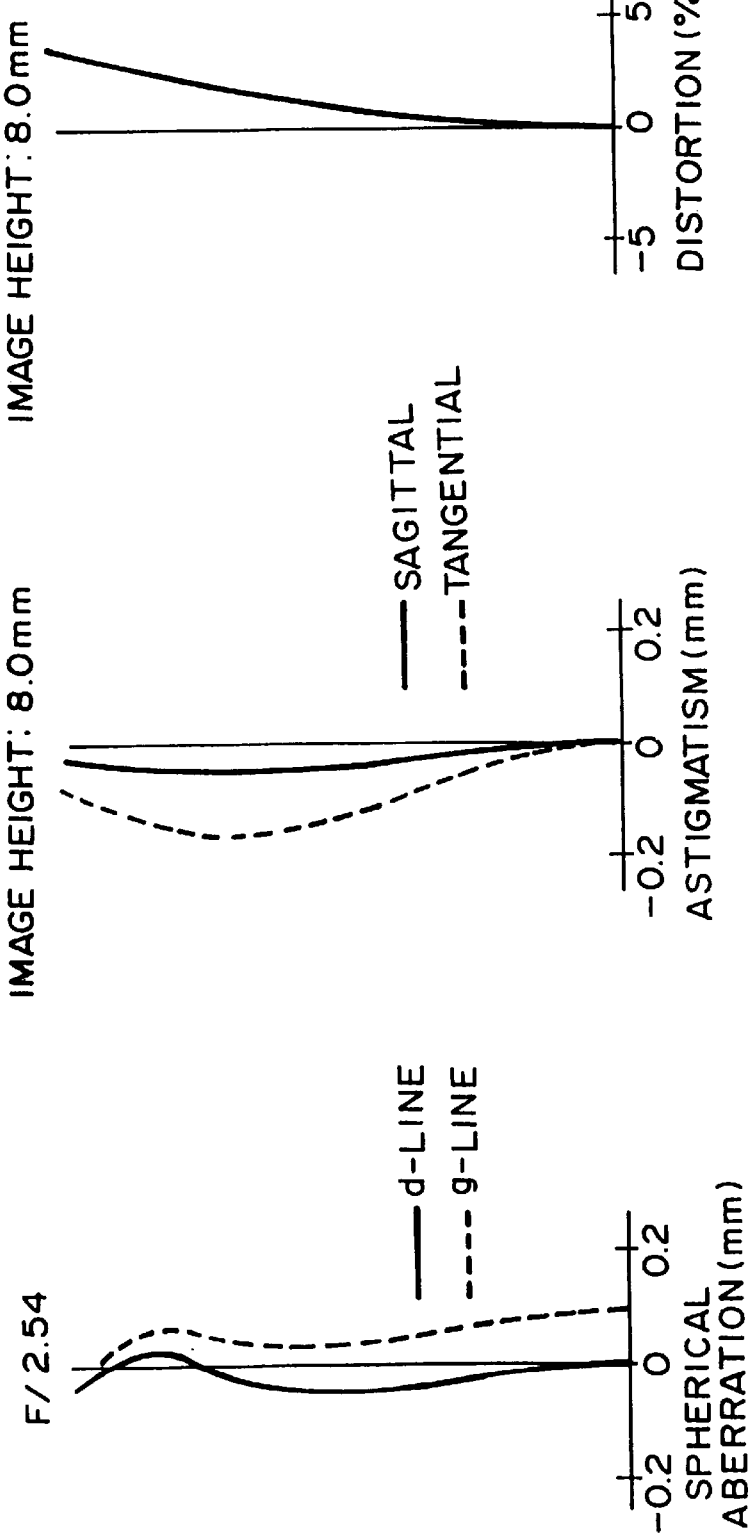

ZOOM LENS

RELATED APPLICATIONS

This application claims the priority of Japanese Patent Application No. 8-352055 filed on Dec. 11, 1996, which is incorporated herein by reference.

BACKGROUND OF THE INVENTION

1. Field of the Invention

The present invention relates to a zoom lens incorporated in a television camera or video camera, for which high resolution, greater variable power, wider angle of view, smaller size, lighter weight, and the like are required and, in particular, to a zoom lens which exhibits a favorable optical performance in the whole variable power range while satisfactorily yielding a great variable power, a wide angle of view, a smaller size, and a lighter weight.

2. Description of the Prior Art

Zoom lenses for television camera, video camera, and the like have conventionally been required to have a great variable power and a high performance.

Almost all the imaging devices used in the current cameras are CCDs (solid-state imaging devices), for which a high resolution is required in the whole screen area. Consequently, it is necessary for a zoom lens used in such a camera to uniformly have a high resolution even in peripheral portions of the screen in the whole variable power range.

Also, as the camera becomes smaller, the zoom lens used therefor is required to have a smaller size as well.

Further, in general, a long back focus is needed in a television camera lens for broadcasting station since a color-separating optical system and various kinds of filters are inserted in front of its imaging device.

Known as a zoom lens satisfying such a requirement are a number of configurations each comprising a first group, fixed upon varying power, having a positive refracting power; a second group having a power-varying effect and a negative refracting power; a third group having a positive refracting power for correcting an image surface shift generated upon the power-varying effect of the second group; and a fourth group, fixed upon varying power, having an imaging effect.

For example, the one disclosed in Japanese Unexamined Patent Publication No. 6-59191 has a lens configuration in which each group has an appropriate allocation of refracting power, while a suitable lens surface is shaped into an aspheric form, in order to attain a high optical performance throughout the variable power range.

In the above-mentioned television zoom lens for broadcasting station, the focal length of the power-varying portion, i.e., that of each of the second and third groups, may be made as short as possible so that the length of the power-varying portion at its wide angle end is minimized, and together therewith, the outer diameter of the first group may be made smaller in order to reduce the size and weight of the whole lens. In this case, however, since the negative refracting power of the second group increases, Petzval sum tends to become greatly negative.

It has conventionally been known that Petzval sum is required to be made lower in order to reduce astigmatism and attain a flatter image surface (disclosed, for example, in Yoshiya Matsui, *Renzu Sekkei Hou* (*Lens Designing Method*), Kyoritsu Shuppan Co., pp. 110–111). In particular, in the television zoom lens requiring a high resolution, the sagittal image surface in the peripheral portion of the screen may especially deteriorate in the whole variable power range unless the Petzval sum value is appropriately set.

SUMMARY OF THE INVENTION

In view of such circumstances, it is an object of the present invention to provide, in a so-called four-group zoom lens, a zoom lens which can satisfy each requirement for high resolution, greater variable power, wider angle of view, smaller size, and lighter weight, while appropriately setting the Petzval sum value, thereby being capable of preventing the sagittal image surface in the peripheral portion of the screen, in particular, from deteriorating.

The present invention provides a zoom lens comprising, successively from an object side, a focus lens section, fixed upon varying power, having a positive refracting power as a whole; a zoom lens section having lens groups for correcting a power-varying effect and an image surface shift generated upon the power-varying effect; and a master lens section, provided with an aperture stop, having an imaging effect;

wherein a combined lens system composed of the focus lens section and the zoom lens section has a positive refracting power; and wherein, in the master lens section, a luminous divergent lens portion is disposed on the object side of the aperture stop, the luminous divergent lens portion being fixed upon varying power, having a negative refracting power as a whole, and comprising at least one sheet of a lens.

Preferably, the lens surface of the luminous divergent lens portion closest to the object has a concave surface.

Preferably, the master lens section comprises a front master lens group and a rear master lens group, forming an afocal system therebetween.

Preferably, the zoom lens section comprises a first zoom lens group having a negative refracting power and a second zoom lens group having a positive refracting power, respective imaging magnifications of the first and second zoom lens groups concurrently becoming −1 at a predetermined point within a power-varying zoom range.

BRIEF DESCRIPTION OF THE DRAWINGS

FIGS. 10A, 10B and 10C are aberration charts of the lens in accordance with Example 1 at its wide-angle end;

FIGS. 11A, 11B and 11C are aberration charts of the lens in accordance with Example 1 at its middle position;

FIGS. 12A, 12B and 12C are aberration charts of the lens in accordance with Example 1 at its telephoto end;

FIGS. 13A, 13B and 13C are aberration charts of the lens in accordance with Example 2 at its wide-angle end;

FIGS. 15A, 15B and 15C are aberration charts of the lens in accordance with Example 2 at its telephoto end;

FIGS. 16A, 16B and 16C are aberration charts of the lens in accordance with Comparative Example 1 at its wide-angle end;

FIGS. 17A, 17B and 17C are aberration charts of the lens in accordance with Comparative Example 1 at its middle position;

FIGS. 18A, 18B and 18C are aberration charts of the lens in accordance with Comparative Example 1 at its telephoto end;

FIGS. 19A, 19B and 19C are aberration charts of the lens in accordance with Comparative Example 2 at its wide-angle end;

FIGS. 20A, 20B and 20C are aberration charts of the lens in accordance with Comparative Example 2 at its middle position; and FIGS. 21A, 21B and 21C are aberration charts of the lens in accordance with Comparative Example 2 at its telephoto end.

DESCRIPTION OF THE PREFERRED EMBODIMENTS

In the following, specific examples of the present invention will be explained with reference to the accompanying drawings.

EXAMPLE 1

Figure 1:
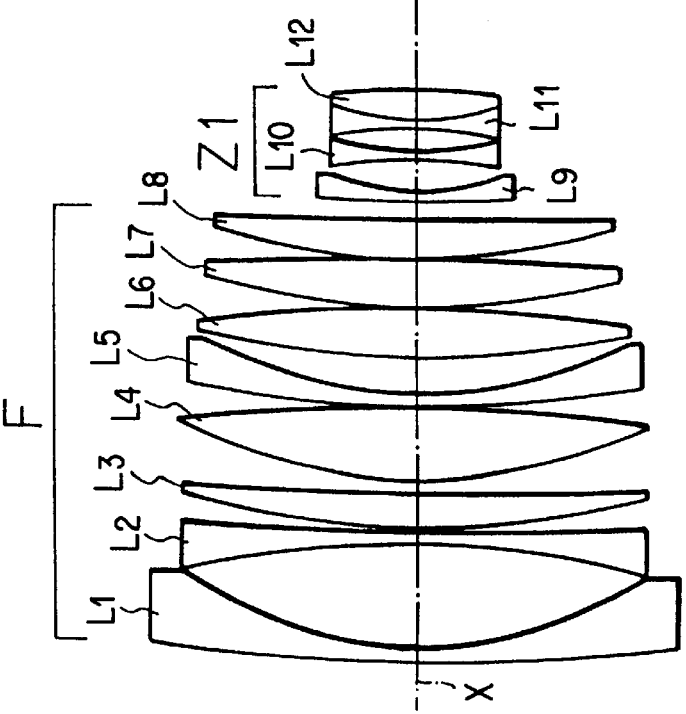
FIG. 1 is a schematic view showing a basic lens configuration in accordance with Example 1 of the present invention.
Figure 2:
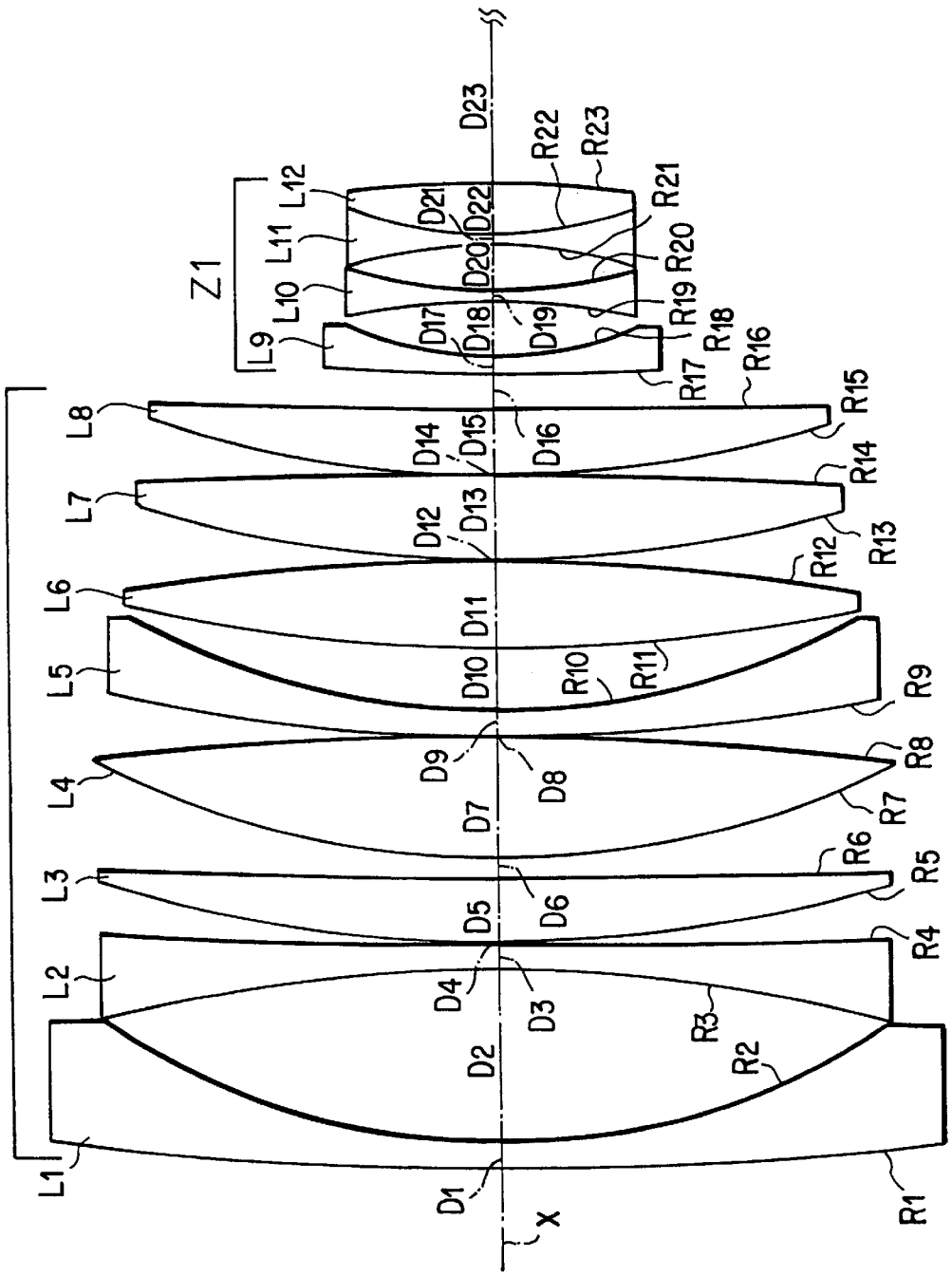
FIG. 2 is a schematic view showing a part of the basic lens configuration in accordance with Example 1 of the present invention.
Figure 3:
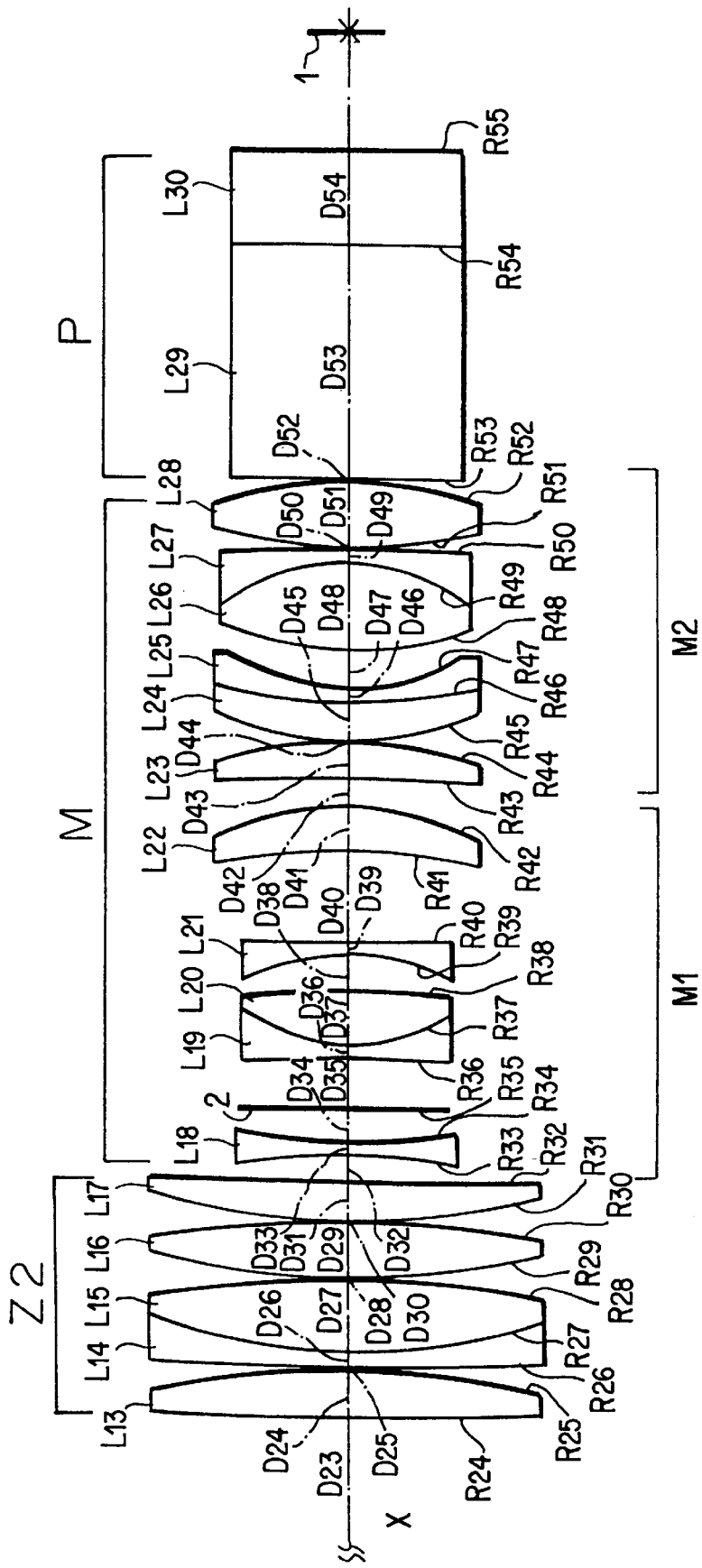
FIG. 3 is a schematic view showing a part of the basic lens configuration in accordance with Example 1 of the present invention.

FIGS. 1 to 3 (FIGS. 2 and 3 being partially enlarged views of FIG. 1) are sectional views showing the lens configuration of a zoom lens in accordance with Example 1. The zoom lens of Example 1 shown in these drawings comprises, successively from the object side, a focus lens group F, composed of 8 sheets of lenses $L_1$ to $L_8$, having a positive refracting power as a whole; a zoom lens first group Z1, composed of 4 sheets of lenses $L_9$ to $L_{12}$, having a negative refracting power as a whole and a power-varying effect; a zoom lens second group Z2, composed of 5 sheets of lenses $L_{13}$ to $L_{17}$, having a positive refracting power as a whole, for correcting an image surface shift generated upon the power-varying effect of the zoom lens first group Z1; a master lens group M, composed of 11 sheets of lenses $L_{18}$ to $L_{28}$ and an aperture stop 2, having an imaging effect; and a prism section P. Further, the master lens section M comprises a front master group M1 and a rear master group M2, forming a substantially afocal system therebetween.

In this zoom lens, while the distance between the two zoom lens groups Z1 and Z2 is changed, they are moved along its optical axis X so as to change the focal length f of the whole system, while a luminous flux is efficiently focused by the master lens group M onto an imaging position on an imaging surface 1. Here, the zoom lens groups Z1 and Z2 are moved such that respective imaging magnifications of both of them concurrently become −1 at a certain point while power varies from the wide-angle end to the telephoto end.

Figure 9:
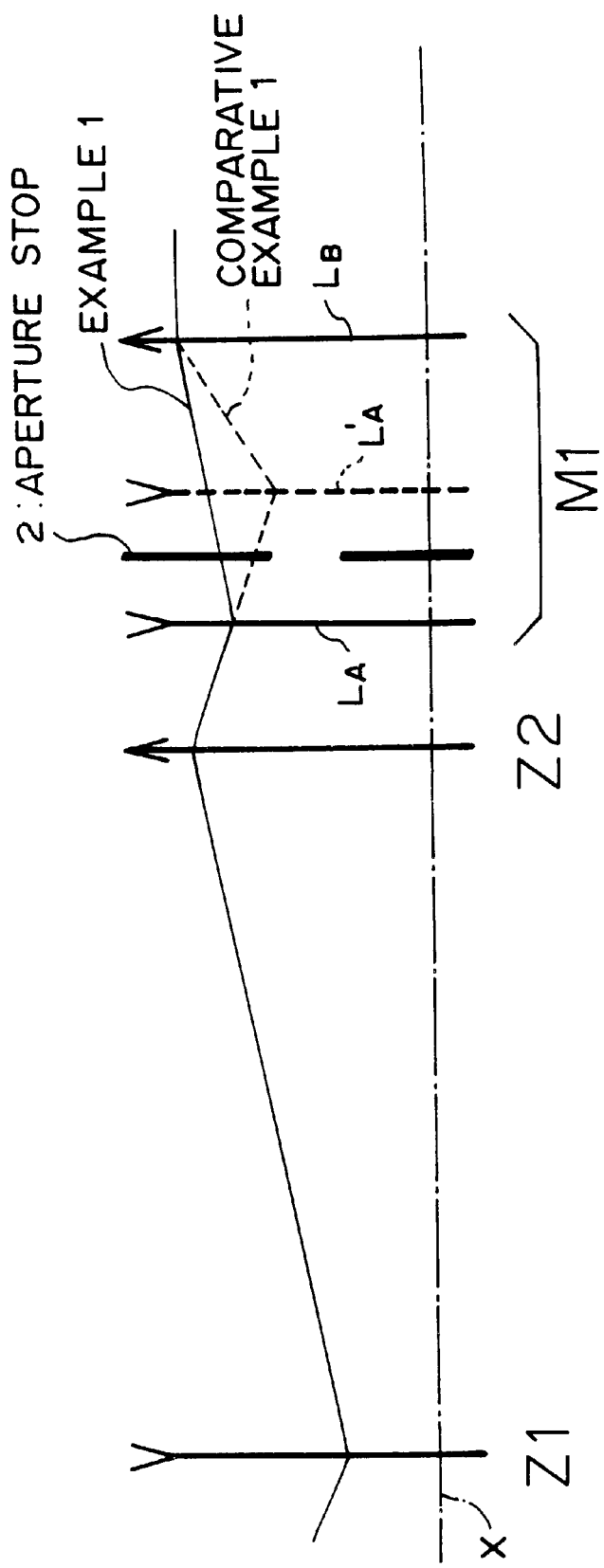
FIG. 9 is a schematic view for explaining an effect of the present invention.
Figure 14C:
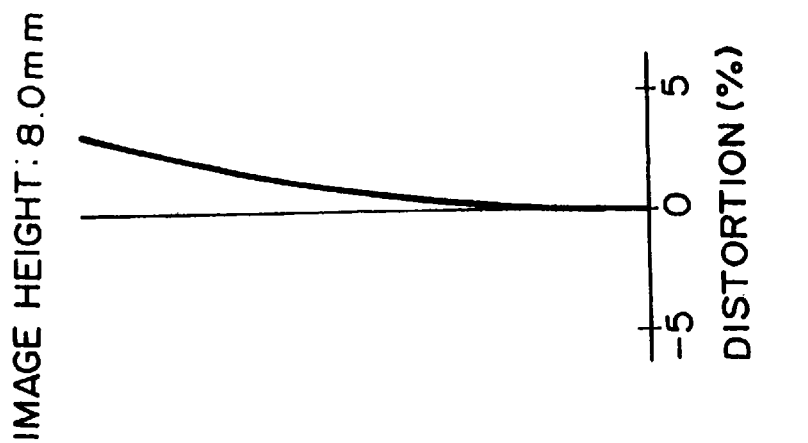
FIGS. 14A, 14B and 14C are aberration charts of the lens in accordance with Example 2 at its middle position.
Figure 14B:
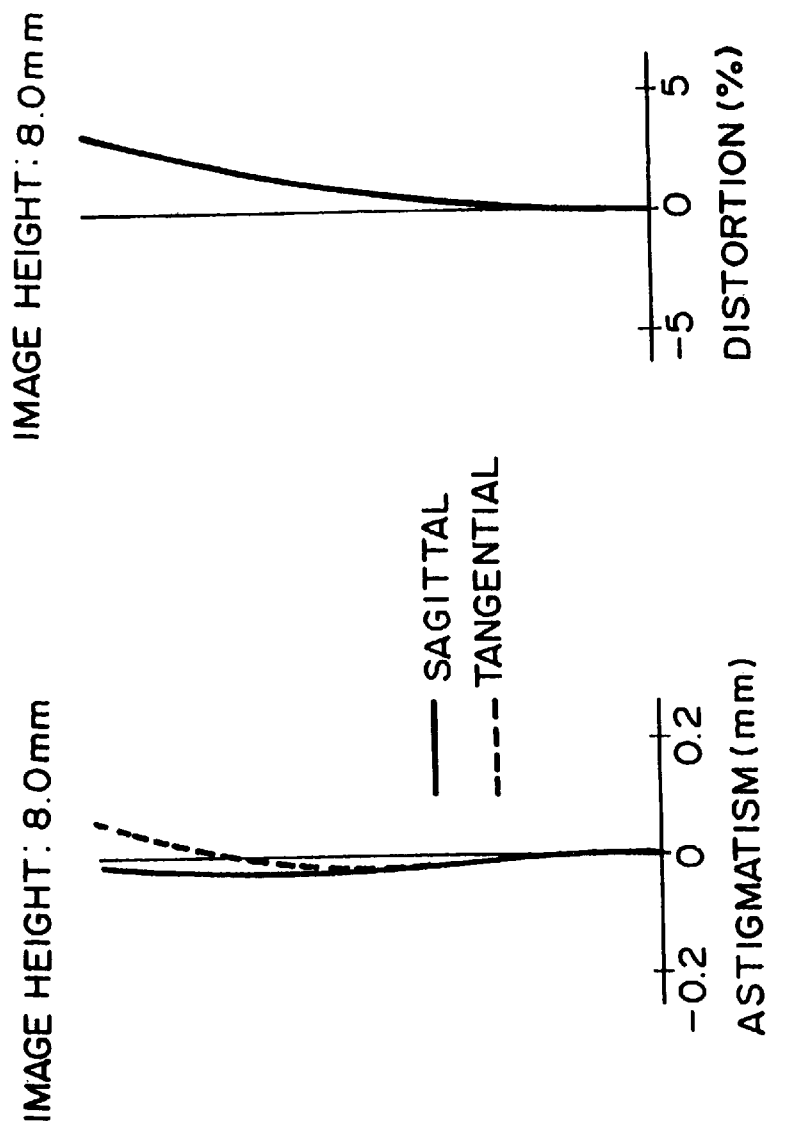
Figure 14A:
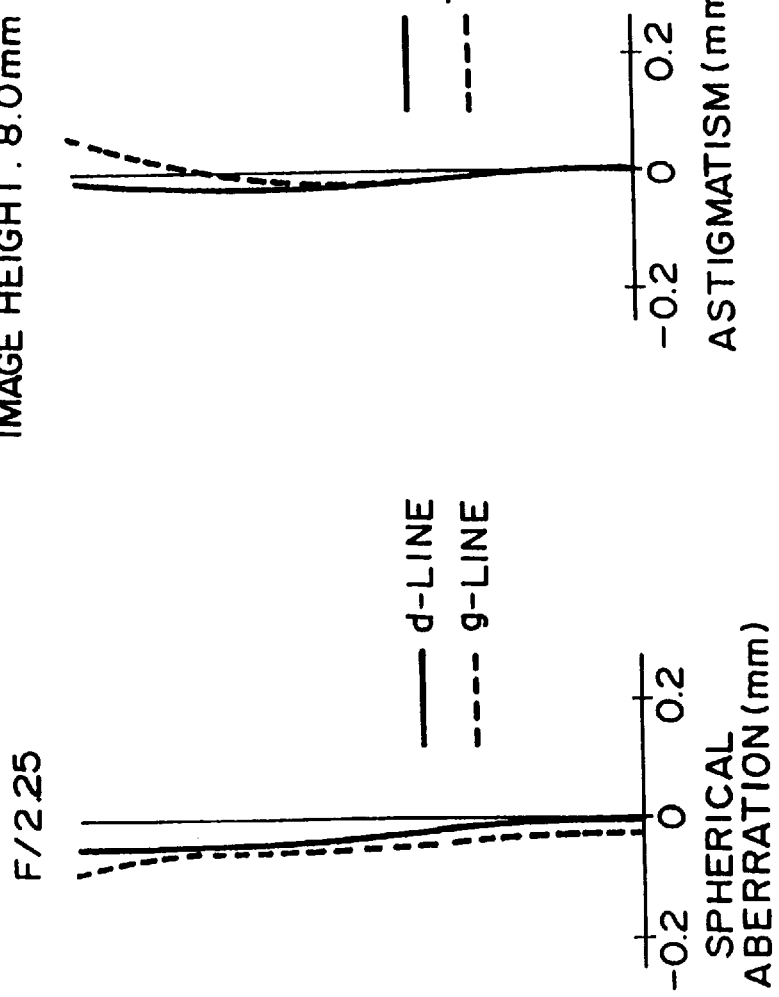

In the front master lens group M1, on the object side of the aperture stop 2, one concave lens $L_{18}$ is disposed closest to the object. In the case of a zoom lens group in which the zoom lens first group Z1 and the zoom lens second group Z2 respectively have concave and convex refracting powers; of the master lens group M that is fixed upon varying power and has an imaging effect as a whole, the front master group M1 is preferably constituted by a group ($L_A$ in FIG. 9), disposed on the object side of the aperture stop 2, having a negative refracting power and including the above-mentioned concave lens $L_{18}$, and a lens group ($L_B$ in FIG. 9), disposed on the image side of the aperture stop 2, having a positive refracting power as a whole, as in the case of this example. Namely, in this configuration, since axial and paraxial light beams which have passed through the zoom lens second group Z2 tend to converge as indicated by a solid line in FIG. 9, the concave lens $L_{18}$ ($L_A$) having a negative refracting power is disposed on the object side of the aperture stop 2, so as to reduce the distance between the zoom lens second group Z2 and the concave lens $L_{18}$ at the wide-angle end. As a result, the axial and paraxial light beams have an increased beam height at the above-mentioned $L_A$, so that the $L_A$ can have a smaller negative refracting power, thus restraining Petzval sum from becoming greatly negative.

Further, this configuration can be explained in terms of expression as follows:

$$\frac{1}{f} = \frac{1}{n'_k [h_1]_\infty} \sum_{i=1}^{k} n_i \frac{[h_i]_\infty}{f_i} \qquad \text{(Expression 1)}$$

wherein a focal length of the whole lens system is f, a refractive index of the i-th surface is $n_i$, a focal length of the i-th surface is $f_i$, a value of $h_i$ (incident height) at $s_1 = -\infty$ is $[h_i]\infty$ (see Hiroshi Kubota, Kogaku (Optics), Iwanami Shoten Publishers, p. 25).

Also, since $[h_1]\infty = 1$ in a lens placed in the air, $$\phi = \sum_{i=1}^{k} [h_i]_\infty \phi_i \qquad \text{(Expression 2)}$$

wherein $1/f = \phi$, and $1/f_i = \phi_i$ ($\phi$ and $\phi i$ respectively being refractive power of the whole lens system and the i-th lens).

Accordingly, in the concave lens, its refracting power can be made smaller as its $[h_i]\infty$ is greater, whereby Petzval sum can be restrained from becoming greatly negative.

Table 1 (follows) lists the radius of curvature R (mm) of each lens surface, center axis of each lens and air gap between adjacent lenses (hereinafter collectively referred to as "axial surface distance") D (mm), and refractive index N and Abbe number ν of each lens at d-line in the zoom lens in accordance with Example 1.

The numbers in this table successively increase from the object side.

Also, in this example, the focal length f from the wide-angle end to the telephoto end and F No. are set as shown in the upper part of Table 2 (follows), whereas values of group distances d1, d2, and d3 in Table 1 at the wide-angle end (8.47 mm), middle position (84.7 mm), and telephoto end (146.45 mm) are set as shown in the lower part of Table 2.

Here, Petzval sum is set to 0.00432.

EXAMPLE 2

Figure 4:
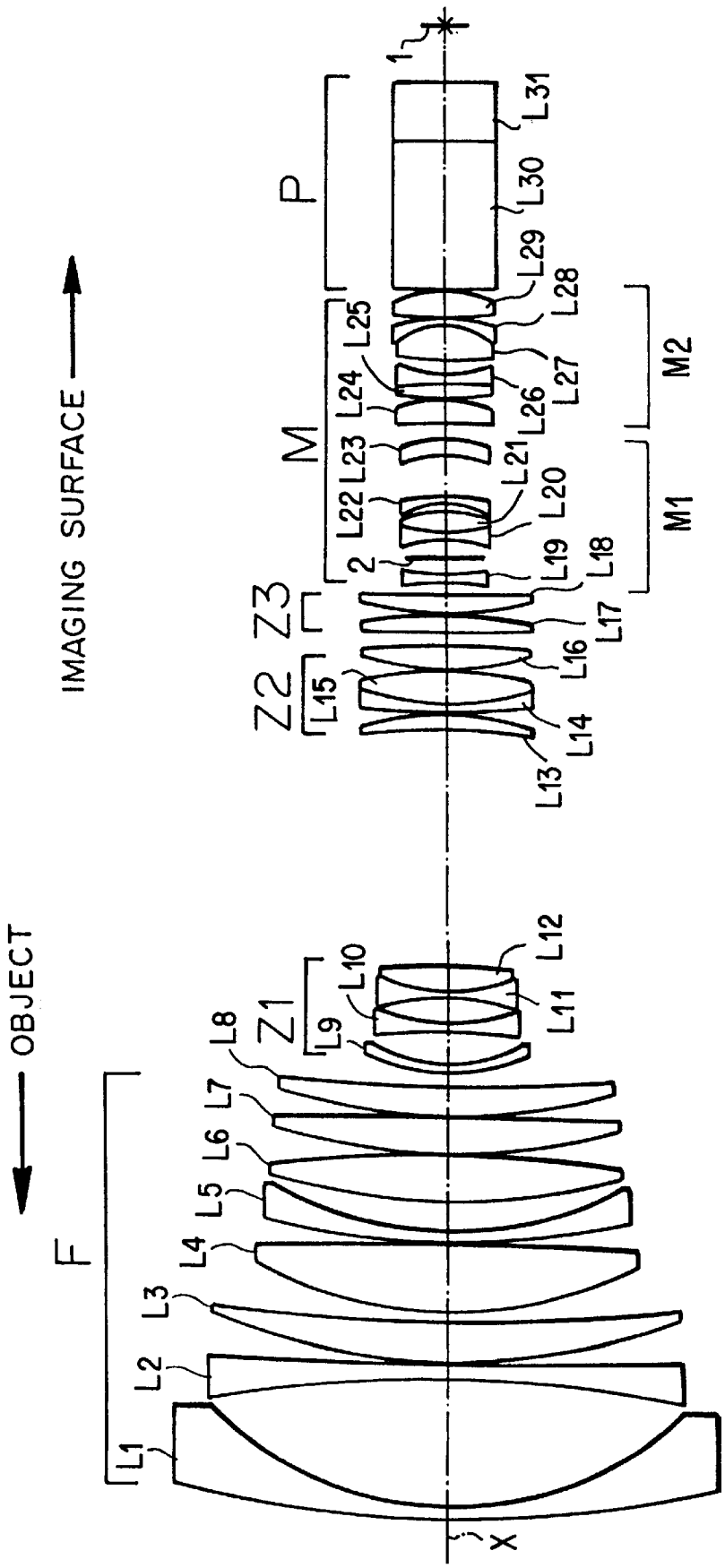
FIG. 4 is a schematic view showing a basic lens configuration in accordance with Example 2 of the present invention.
Figure 5:
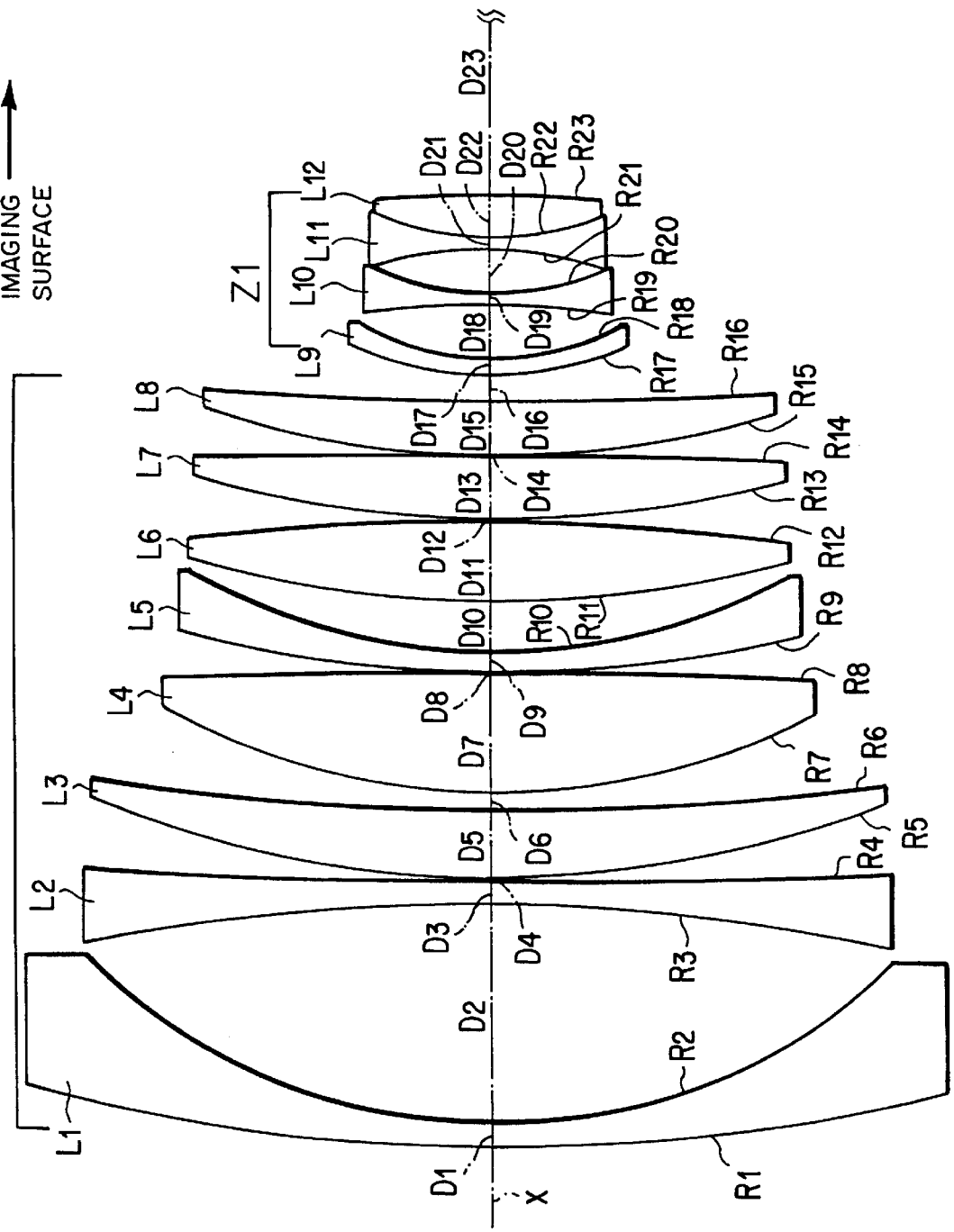
FIG. 5 is a schematic view showing a part of the basic lens configuration in accordance with Example 2 of the present invention.
Figure 6:
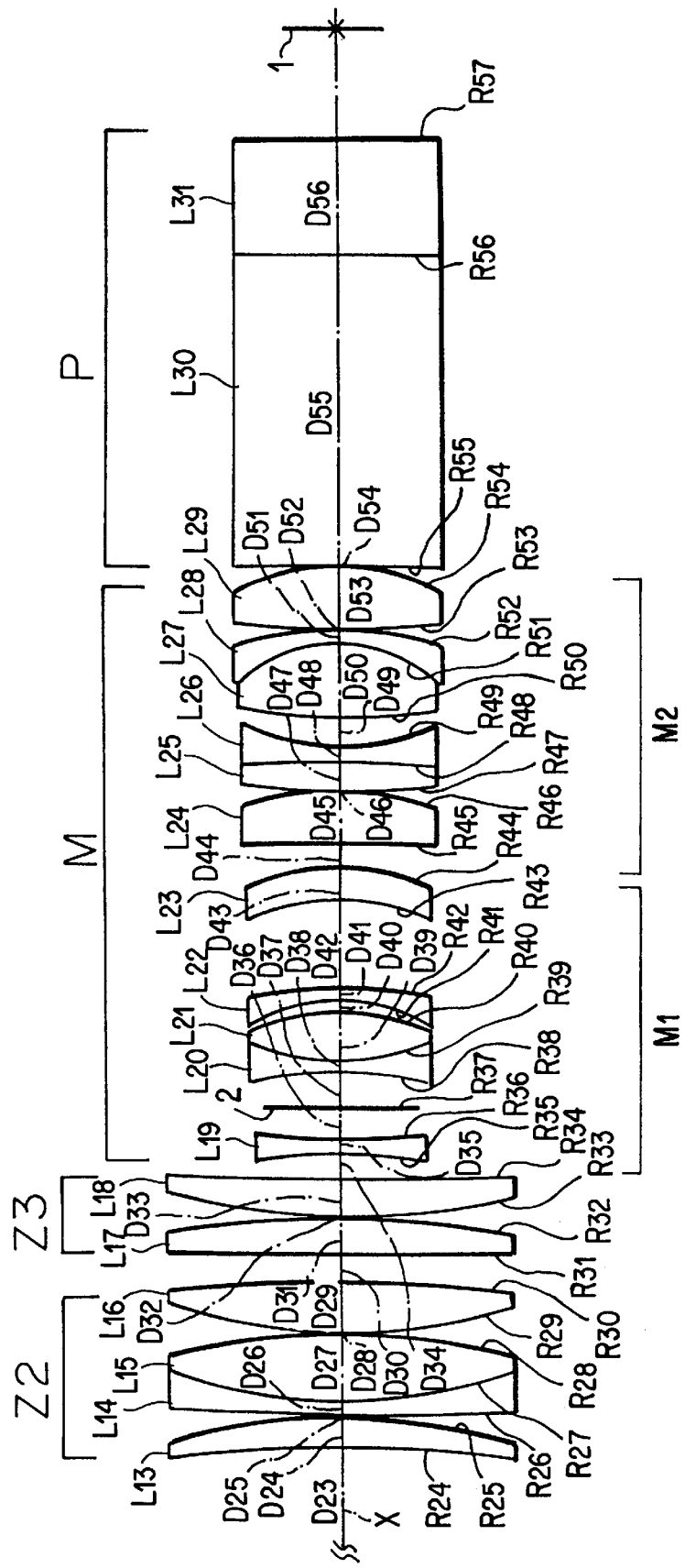
FIG. 6 is a schematic view showing a part of the basic lens configuration in accordance with Example 2 of the present invention.

FIGS. 4 to 6 (FIGS. 5 and 6 being partially enlarged views of FIG. 4) are sectional views showing the lens configuration of a zoom lens in accordance with Example 2.

The zoom lens of Example 2 is configured basically the same as that of Example 1 except that the zoom lens second group Z2 is divided into two lens groups of Z2 (composed of 4 sheets of lenses $L_{13}$ to $L_{16}$) and Z3 (composed of 2 sheets of lenses $L_{17}$ and $L_{18}$) (hereinafter respectively referred to as "zoom lens second group Z2" and "zoom lens third group Z3").

Table 3 (follows) lists the radius of curvature R (mm) of each lens surface, axial surface distance D (mm), and refractive index N and Abbe number ν of each lens at d-line in the zoom lens in accordance with Example 2.

The numbers in this table successively increase from the object side.

Also, in this example, the focal length f from the wide-angle end to the telephoto end and F No. are set as shown in the upper part of Table 4 (follows), whereas values of group distances d1, d2, and d3 in Table 3 at the wide-angle end (12.28 mm), middle position (122.8 mm), and telephoto end (212.38 mm) are set as shown in the lower part of Table 4.

Here, Petzval sum is set to 0.00181.

COMPARATIVE EXAMPLE 1

Figure 7:
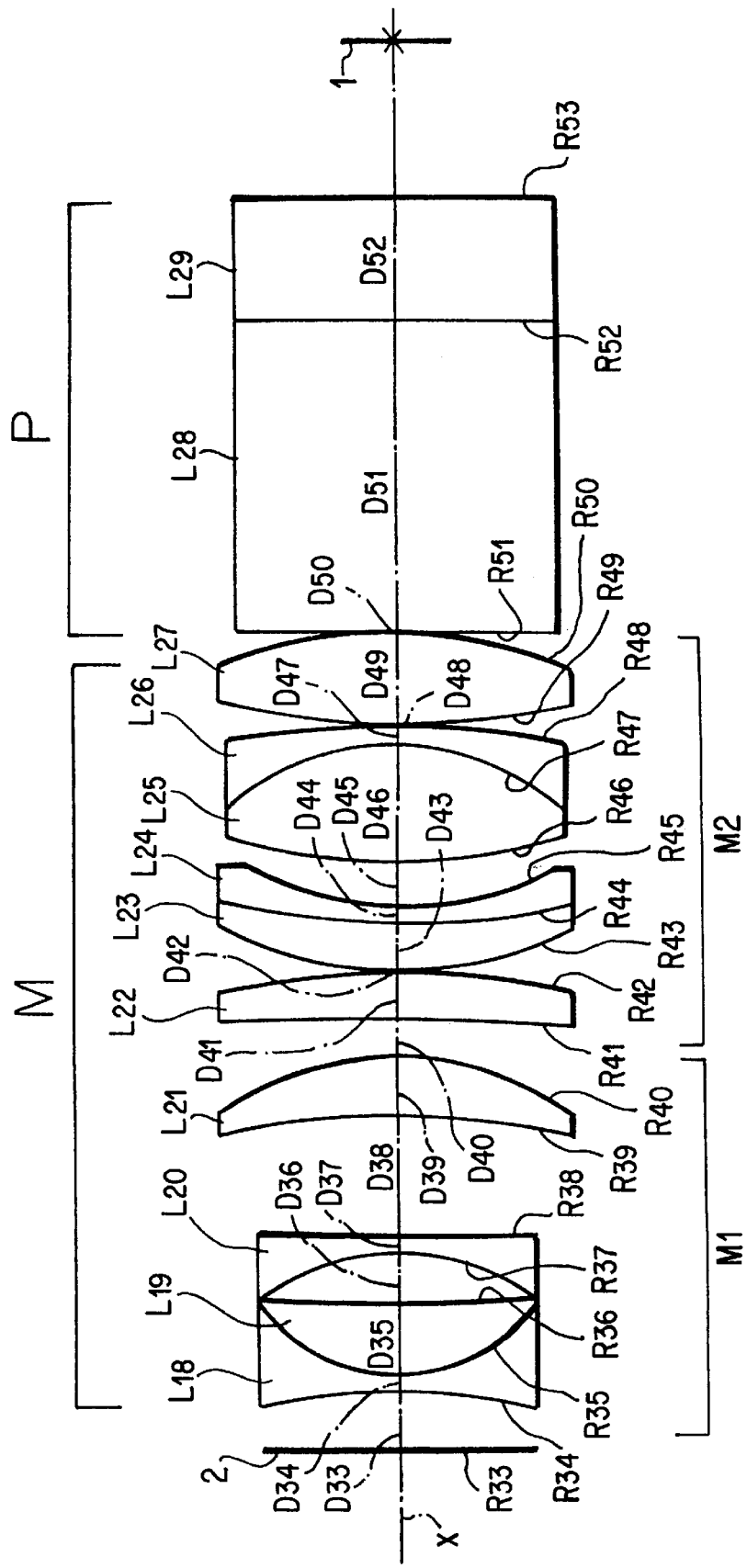
FIG. 7 is a schematic view showing a part of a basic lens configuration in accordance with Comparative Example 1 of the present invention.

FIG. 7 is a sectional view showing a part of lens configuration (master lens group M and prism section P) of a zoom lens in accordance with Comparative Example 1. Here, its focus lens group F, zoom lens first group Z1, and zoom lens second group Z2 are identical to those in the above-mentioned Example 1. In the zoom lens of Comparative Example 1 shown in FIG. 7, the aperture stop 2 is placed out of the front master group M1 on the object side, whereby no lens is disposed between the zoom lens second group Z2 and the aperture stop 2. While axial and paraxial light beams which have passed through the zoom lens second group Z2 form images due to negative and positive lens groups $L'_A$ and $L_B$ constituting the front master group M1, they are diverged by the negative lens group ($L'_A$) at a position farther separated from the zoom lens second group Z2 than the $L_A$ in Example 1, as indicated by a dashed line in FIG. 9, whereby the above-mentioned value of $[h_r]\infty$ becomes smaller, thus increasing the negative refracting power in the $L'_A$. Consequently, Petzval sum becomes greatly negative, whereby the image quality in the periphery of the image surface is more likely to deteriorate.

Table 5 (follows) lists the radius of curvature R (mm) of each lens surface, axial surface distance D (mm), and refractive index N and Abbe number ν of each lens at d-line in the zoom lens in accordance with Comparative Example 1.

The numbers in this table successively increase from the object side.

Also, in this comparative example, the focal length f from the wide-angle end to the telephoto end and F No. are set as shown in the lower part of Table 5.

Here, Petzval sum is set to 0.00071.

COMPARATIVE EXAMPLE 2

Figure 8:
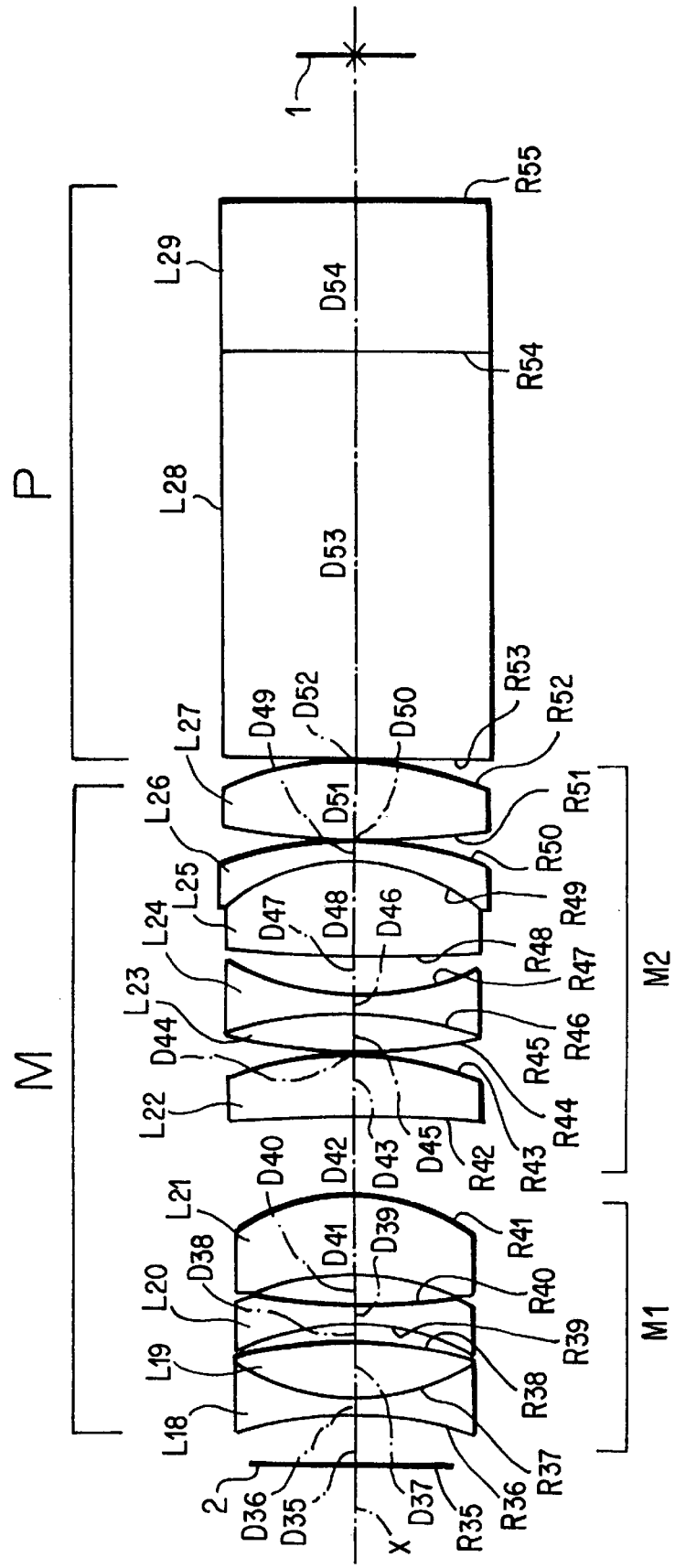
FIG. 8 is a schematic view showing a part of a basic lens configuration in accordance with Comparative Example 2 of the present invention.

FIG. 8 is a sectional view showing a part of lens configuration (master lens group M and prism section P) of a zoom lens in accordance with Comparative Example 2. Here, its focus lens group F, zoom lens first group Z1, zoom lens second group Z2, and zoom lens third group Z3 are identical to those in the above-mentioned Example 2. In the zoom lens of Comparative Example 2 shown in FIG. 8, as with the above-mentioned Comparative Example 1, the aperture stop 2 is placed out of the front master group M1 on the object side, whereby no lens is disposed between the zoom lens third group Z3 and the aperture stop 2. While axial and paraxial light beams which have passed through the zoom lens third group Z3 form images due to negative and positive lens groups $L'_A$ and $L_B$ constituting the front master group M1, they are diverged by the negative lens group ($L'_A$) at a position farther separated from the zoom lens third group Z3 than the $L_A$ in Example 2, whereby the above-mentioned value of $[h_r]\infty$ becomes smaller, thus increasing the negative refracting power in the $L'_A$. Consequently, Petzval sum becomes greatly negative, whereby the image quality in the periphery of the image surface is more likely to deteriorate.

Table 6 (follows) lists the radius of curvature R (mm) of each lens surface, axial surface distance D (mm), and refractive index N and Abbe number ν of each lens at d-line in the zoom lens in accordance with Comparative Example 2.

The numbers in this table successively increase from the object side.

Also, in this comparative example, the focal length f from the wide-angle end to the telephoto end and F No. are set as shown in the lower part of Table 6.

Here, Petzval sum is set to –0.00134.

FIGS. 10, 13, 16, and 19 are aberration charts showing various kinds of aberration (spherical aberration, astigmatism, and distortion) of the zoom lenses in accordance with the above-mentioned Examples and Comparative Examples at their wide-angle ends. FIGS. 11, 14, 17, and 20 are aberration charts shoving various kinds of aberration (spherical aberration, astigmatism, and distortion) of the zoom lenses in accordance with the above-mentioned Examples and Comparative Examples at their middle positions. FIGS. 12, 15, 18, and 21 are aberration charts showing various kinds of aberration (spherical aberration, astigmatism, and distortion) of the zoom lenses in accordance with the above-mentioned Examples and Comparative Examples at their telephoto ends. Here, each spherical aberration chart indicates aberrations concerning d-line and g-line, whereas each astigmatism chart indicates aberrations concerning sagittal (S) and tangential (T) image surfaces. As can be seen from these aberration charts, the zoom lenses of the above-mentioned Examples can favorably correct each kind of aberration.

The zoom lens of the present invention should not be restricted to the above-mentioned Examples. For instance, the form of lenses constituting each lens group can be selected appropriately. Also, for example, the above-mentioned zoom lens first group Z1, as the zoom lens group, may be divided into two.

In the zoom lens of the present invention, in its master lens section having an imaging effect, a lens portion is disposed on the object side of the aperture stop, the lens having a negative refracting power portion being fixed upon varying power, having a negative refracting power as a whole, and comprising at least one sheet of a lens. Accordingly, the distance between the zoom lens section and the luminous divergent lens portion is made smaller, so as to restrain Petzval sum from becoming greatly negative. As a result, various kinds of aberration, such as astigmatism in particular, can be made favorable, whereby the image quality in the periphery of the image surface can be restrained from deteriorating.

TABLE 1

| surface | R | D | N | ν |
|---|---|---|---|---|
| 1 | 557.674 | 4.30 | 1.77250 | 49.6 |
| 2 | 112.434 | 28.00 | 1.00000 | |
| 3 | −261.504 | 3.80 | 1.77250 | 49.6 |
| 4 | 1511.372 | 1.00 | 1.00000 | |
| 5 | 220.911 | 10.00 | 1.84665 | 23.9 |
| 6 | 1851.518 | 3.50 | 1.00000 | |
| 7 | 140.717 | 20.00 | 1.43875 | 94.9 |
| 8 | −533.163 | 0.20 | 1.00000 | |
| 9 | 327.636 | 3.70 | 1.80517 | 25.4 |
| 10 | 123.960 | 10.00 | 1.00000 | |
| 11 | 256.585 | 14.00 | 1.49700 | 81.6 |
| 12 | −390.798 | 0.20 | 1.00000 | |
| 13 | 199.332 | 13.50 | 1.49700 | 81.6 |
| 14 | −1588.801 | 0.20 | 1.00000 | |
| 15 | 178.311 | 10.50 | 1.58913 | 61.2 |
| 16 | 1463.638 | d1 | 1.00000 | |
| 17 | 312.156 | 3.00 | 1.74100 | 52.6 |
| 18 | 60.683 | 9.00 | 1.00000 | |
| 19 | −124.275 | 2.00 | 1.80609 | 40.9 |
| 20 | 87.224 | 7.00 | 1.00000 | |
| 21 | −97.663 | 2.00 | 1.72916 | 54.7 |
| 22 | 66.987 | 8.30 | 1.84665 | 23.9 |
| 23 | −198.160 | d2 | 1.00000 | |
| 24 | 380.255 | 7.00 | 1.49700 | 81.6 |
| 25 | −115.029 | 0.20 | 1.00000 | |
| 26 | 521.702 | 2.40 | 1.84665 | 23.9 |
| 27 | 90.397 | 10.00 | 1.49700 | 81.6 |
| 28 | −174.832 | 0.20 | 1.00000 | |
| 29 | 103.262 | 8.00 | 1.49700 | 81.6 |
| 30 | −183.397 | 0.20 | 1.00000 | |
| 31 | 96.388 | 6.00 | 1.49700 | 81.6 |
| 32 | 1604.787 | d3 | 1.00000 | |
| 33 | −88.209 | 2.00 | 1.77250 | 49.6 |
| 34 | 97.939 | 5.00 | 1.00000 | |
| 35 | ∞ | 6.50 | 1.00000 | |
| 36 | −326.150 | 2.00 | 1.77250 | 49.6 |
| 37 | 26.576 | 7.40 | 1.84665 | 23.9 |
| 38 | −121.151 | 5.30 | 1.00000 | |
| 39 | −31.960 | 2.00 | 1.80400 | 46.6 |
| 40 | −473.687 | 13.20 | 1.00000 | |
| 41 | −84.889 | 6.50 | 1.73399 | 51.5 |
| 42 | −37.823 | 4.00 | 1.00000 | |
| 43 | −335.152 | 5.00 | 1.51680 | 64.2 |
| 44 | −58.320 | 0.20 | 1.00000 | |
| 45 | 47.132 | 5.00 | 1.51741 | 52.4 |
| 46 | 76.556 | 2.00 | 1.83480 | 42.7 |
| 47 | 34.723 | 5.00 | 1.00000 | |
| 48 | 47.849 | 12.30 | 1.51680 | 64.2 |
| 49 | −28.721 | 2.00 | 1.80517 | 25.4 |
| 50 | −384.461 | 0.20 | 1.00000 | |
| 51 | 81.724 | 9.70 | 1.51680 | 64.2 |
| 52 | −46.855 | 0.0 | 1.00000 | |
| 53 | ∞ | 33.00 | 1.58267 | 46.5 |
| 54 | ∞ | 13.20 | 1.51633 | 64.0 |
| 55 | ∞ | 20.80 | 1.00000 | |

TABLE 2 f = 8.47 to 146.45
FNo. 1.54 to 1.94
Group distance of Example 1

| Focal length | 8.47 | 84.7 | 146.45 |
|---|---|---|---|
| d1 | 5.61 | 120.00 | 131.86 |
| d2 | 174.99 | 2.40 | 5.14 |
| d3 | 4.14 | 34.75 | 47.76 |

TABLE 3

| surface | R | D | N | ν |
|---|---|---|---|---|
| 1 | 350.810 | 4.30 | 1.77250 | 49.6 |
| 2 | 110.280 | 43.00 | 1.00000 | |
| 3 | −371.420 | 3.80 | 1.77250 | 49.6 |
| 4 | 1520.400 | 1.00 | 1.00000 | |
| 5 | 203.020 | 12.80 | 1.84665 | 23.8 |
| 6 | 547.510 | 3.50 | 1.00000 | |
| 7 | 131.920 | 23.00 | 1.43875 | 95.0 |
| 8 | −2447.000 | 0.20 | 1.00000 | |
| 9 | 242.880 | 3.70 | 1.80517 | 25.4 |
| 10 | 115.640 | 10.00 | 1.00000 | |
| 11 | 204.650 | 16.00 | 1.49700 | 81.6 |
| 12 | −450.670 | 0.20 | 1.00000 | |
| 13 | 207.680 | 11.80 | 1.49700 | 81.6 |
| 14 | −5428.900 | 0.20 | 1.00000 | |
| 15 | 180.000 | 10.00 | 1.61800 | 63.3 |
| 16 | 662.360 | d1 | 1.00000 | |
| 17 | 64.401 | 3.00 | 1.74100 | 52.6 |
| 18 | 48.560 | 11.00 | 1.00000 | |
| 19 | −148.200 | 2.00 | 1.80609 | 40.9 |
| 20 | 54.067 | 8.70 | 1.00000 | |
| 21 | −66.091 | 2.00 | 1.72916 | 54.7 |
| 22 | 54.060 | 8.30 | 1.84665 | 23.9 |
| 23 | −287.630 | d2 | 1.00000 | |
| 24 | −196.190 | 5.00 | 1.49700 | 81.6 |
| 25 | −87.133 | 0.20 | 1.00000 | |
| 26 | 431.000 | 2.40 | 1.84665 | 23.8 |
| 27 | 83.964 | 11.50 | 1.49700 | 81.6 |
| 28 | −106.380 | 0.20 | 1.00000 | |
| 29 | 88.030 | 8.00 | 1.49700 | 81.6 |
| 30 | −264.760 | d3 | 1.00000 | |
| 31 | 1540.100 | 6.00 | 1.49700 | 81.6 |
| 32 | −152.190 | 0.20 | 1.00000 | |
| 33 | 116.550 | 6.00 | 1.49700 | 81.6 |
| 34 | 552.650 | d4 | 1.00000 | |
| 35 | −81.762 | 2.00 | 1.77250 | 49.6 |
| 36 | 124.718 | 5.00 | 1.00000 | |
| 37 | ∞ | 6.50 | 1.00000 | |
| 38 | −51.961 | 2.00 | 1.77250 | 49.6 |
| 39 | 45.410 | 7.40 | 1.84665 | 23.8 |
| 40 | −35.934 | 2.30 | 1.00000 | |
| 41 | −30.434 | 2.00 | 1.80400 | 46.6 |
| 42 | −72.498 | 13.70 | 1.00000 | |
| 43 | −35.865 | 5.00 | 1.73399 | 51.4 |
| 44 | −37.915 | 5.00 | 1.00000 | |
| 45 | −277.510 | 8.00 | 1.51680 | 64.2 |
| 46 | −45.165 | 0.20 | 1.00000 | |
| 47 | 122.208 | 5.00 | 1.51680 | 64.2 |
| 48 | −310.741 | 2.00 | 1.83480 | 42.7 |
| 49 | 37.176 | 5.00 | 1.00000 | |
| 50 | 79.378 | 12.30 | 1.51680 | 64.2 |
| 51 | −22.573 | 2.00 | 1.80517 | 25.4 |
| 52 | −55.008 | 0.20 | 1.00000 | |
| 53 | 213.274 | 9.70 | 1.51680 | 64.2 |
| 54 | −38.267 | 0.0 | 1.00000 | |
| 55 | ∞ | 50.00 | 1.69680 | 55.6 |
| 56 | ∞ | 19.00 | 1.51633 | 64.0 |
| 57 | ∞ | 26.92 | 1.00000 | |

TABLE 4 f = 12.28 to 212.38
FNo. 2.25 to 2.54
Group distance of Example 2

| Focal length | 12.28 | 122.8 | 212.38 |
|---|---|---|---|
| d1 | 5.19 | 110.48 | 120.68 |
| d2 | 160.25 | 27.47 | 4.16 |
| d3 | 4.50 | 3.94 | 4.50 |
| d4 | 4.34 | 32.39 | 44.93 |

TABLE 5 f = 8.47 to 146.45
FNo. 1.54 to 1.94
(Surface Nos. 1 to 32 are the same as those in Example 1)

| Surface | R | D | N | ν |
|---|---|---|---|---|
| 33 | ∞ | 6.50 | 1.00000 | |
| 34 | −82.393 | 2.00 | 1.77250 | 49.6 |
| 35 | 19.137 | 7.40 | 1.84665 | 23.9 |
| 36 | 115.915 | 5.30 | 1.00000 | |
| 37 | −25.397 | 2.00 | 1.80400 | 46.6 |
| 38 | −2425.007 | 13.20 | 1.00000 | |
| 39 | −90.368 | 6.50 | 1.73399 | 51.5 |
| 40 | −31.581 | 4.00 | 1.00000 | |
| 41 | −339.654 | 5.00 | 1.51680 | 64.2 |
| 42 | −81.885 | 0.20 | 1.00000 | |
| 43 | 40.650 | 5.00 | 1.51741 | 52.4 |
| 44 | 76.364 | 2.00 | 1.83480 | 42.7 |
| 45 | 34.508 | 5.00 | 1.00000 | |
| 46 | 65.110 | 12.30 | 1.51680 | 64.2 |
| 47 | −27.275 | 2.00 | 1.80517 | 25.4 |
| 48 | −104.073 | 0.20 | 1.00000 | |
| 49 | 82.795 | 9.70 | 1.51680 | 64.2 |
| 50 | −48.144 | 0.0 | 1.00000 | |
| 51 | ∞ | 33.00 | 1.58267 | 46.5 |
| 52 | ∞ | 13.20 | 1.51633 | 64.0 |
| 53 | ∞ | 20.78 | 1.00000 | |

TABLE 6 f = 12.28 to 212.38
FNo. 2.25 to 2.54
(Surface Nos. 1 to 34 are the same as those in Example 2)

| Surface | R | D | N | ν |
|---|---|---|---|---|
| 35 | ∞ | 6.50 | 1.00000 | |
| 36 | −42.140 | 2.00 | 1.77250 | 49.6 |
| 37 | 27.387 | 7.40 | 1.84665 | 23.9 |
| 38 | −56.752 | 2.30 | 1.00000 | |
| 39 | −33.688 | 2.00 | 1.80400 | 46.6 |
| 40 | 91.199 | 3.70 | 1.00000 | |
| 41 | −32.938 | 10.00 | 1.73399 | 51.4 |
| 42 | −27.018 | 10.00 | 1.00000 | |
| 43 | −208.566 | 8.00 | 1.51680 | 64.2 |
| 44 | −38.282 | 0.20 | 1.00000 | |
| 45 | 86.937 | 5.00 | 1.51741 | 52.4 |
| 46 | −50.342 | 2.00 | 1.83480 | 42.7 |

TABLE 6-continued

| 47 | 37.449 | 5.00 | 1.00000 | |
|---|---|---|---|---|
| 48 | 157.415 | 12.30 | 1.51680 | 64.2 |
| 49 | −24.021 | 2.00 | 1.80517 | 25.4 |
| 50 | −49.704 | 0.20 | 1.00000 | |
| 51 | 109.695 | 9.70 | 1.51680 | 64.2 |
| 52 | −39.630 | 0.0 | 1.00000 | |
| 53 | ∞ | 50.00 | 1.69680 | 55.6 |
| 54 | ∞ | 19.00 | 1.51633 | 64.0 |
| 55 | ∞ | 26.95 | 1.00000 | |

What is claimed is:

1. A zoom lens comprising, successively from an object side, a focus lens section, fixed upon varying power, having a positive refracting power as a whole; a zoom lens section having lens groups for correcting a power-varying effect and an image surface shift generated upon the power-varying effect; and a master lens section, provided with an aperture stop, having an imaging effect;

wherein a combined lens system comprising said focus lens section and said zoom lens section has a positive refracting power; and wherein, in said master lens section, a lens portion is disposed on the object side of said aperture stop, said lens portion being fixed upon varying power, having a negative refracting power as a whole, and comprising at least one sheet of a lens.

2. A zoom lens according to claim 1, wherein the lens surface of said lens having a negative refractive power portion closest to the object has a concave surface.

3. A zoom lens according to claim 1, wherein said master lens section comprises a front master lens group and a rear master lens group, forming an afocal system therebetween.

4. A zoom lens according to claim 1, wherein said zoom lens section comprises a first zoom lens group having a negative refracting power and a second zoom lens group having a positive refracting power, respective imaging magnifications of said first and second zoom lens groups concurrently becoming −1 at a predetermined point within a power-varying zoom range.

* * * * *